United States Patent
Bates et al.

(10) Patent No.: US 7,983,133 B2
(45) Date of Patent: Jul. 19, 2011

(54) PORTABLE DATA STORAGE ASSEMBLY HAVING A HOLOGRAPHIC DATA STORAGE LAYER AND AN OPTICAL TRACKING LAYER

(75) Inventors: Allen Keith Bates, Tucson, AZ (US); Nils Haustein, Soergenloch (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 12/109,984

(22) Filed: Apr. 25, 2008

(65) Prior Publication Data

US 2009/0268568 A1    Oct. 29, 2009

(51) Int. Cl.
*G11B 7/00* (2006.01)

(52) U.S. Cl. .................... 369/103; 369/53.2; 369/44.26; 369/44.28; 369/94

(58) Field of Classification Search .................. 369/103, 369/94, 44.26, 44.28, 47.17, 53.2
See application file for complete search history.

(56) References Cited

U.S. PATENT DOCUMENTS

| | | | |
|---|---|---|---|
| 3,976,354 A | | 8/1976 | Braitberg et al. |
| 4,295,162 A | | 10/1981 | Carlsen |
| 4,420,829 A | * | 12/1983 | Carlson .................. 369/103 |
| 5,285,438 A | * | 2/1994 | Marchand et al. ............ 369/103 |
| 6,574,174 B1 | * | 6/2003 | Amble et al. ............... 369/44.26 |
| 2007/0223326 A1 | * | 9/2007 | Yamamoto et al. ........ 369/44.28 |
| 2007/0258343 A1 | * | 11/2007 | Jung et al. ................... 369/103 |
| 2008/0137494 A1 | * | 6/2008 | Trautner et al. ............ 369/44.26 |
| 2009/0034388 A1 | * | 2/2009 | Nakano et al. ................. 369/94 |
| 2009/0103415 A1 | * | 4/2009 | Usami .......................... 369/103 |

FOREIGN PATENT DOCUMENTS

| | | |
|---|---|---|
| JP | 2003208010 | 11/1991 |
| JP | 2003178457 | 6/2003 |

OTHER PUBLICATIONS

Shigeru Furumiya et al., "Wobble-address format of the Blu-ray Disc", IEEE, 2002, pp. 266-268.*
Geoffrey W Burr, "Three-dimensional optical storage", IBM Research Center, Aug. 2003, pp. 1-15.*

* cited by examiner

*Primary Examiner* — Thuy N Pardo
(74) *Attorney, Agent, or Firm* — Dale F. Regelman; Quarles & Brady LLP

(57) ABSTRACT

A portable data storage assembly, comprising a holographic data storage layer, and an optical tracking layer comprising addressing information for the holographic data storage layer, wherein that addressing information defines a first storage band comprising a first plurality of storage addresses and a second storage band comprising a second plurality of storage addresses, wherein said second plurality of storage addresses is greater than said first plurality of storage addresses.

17 Claims, 21 Drawing Sheets

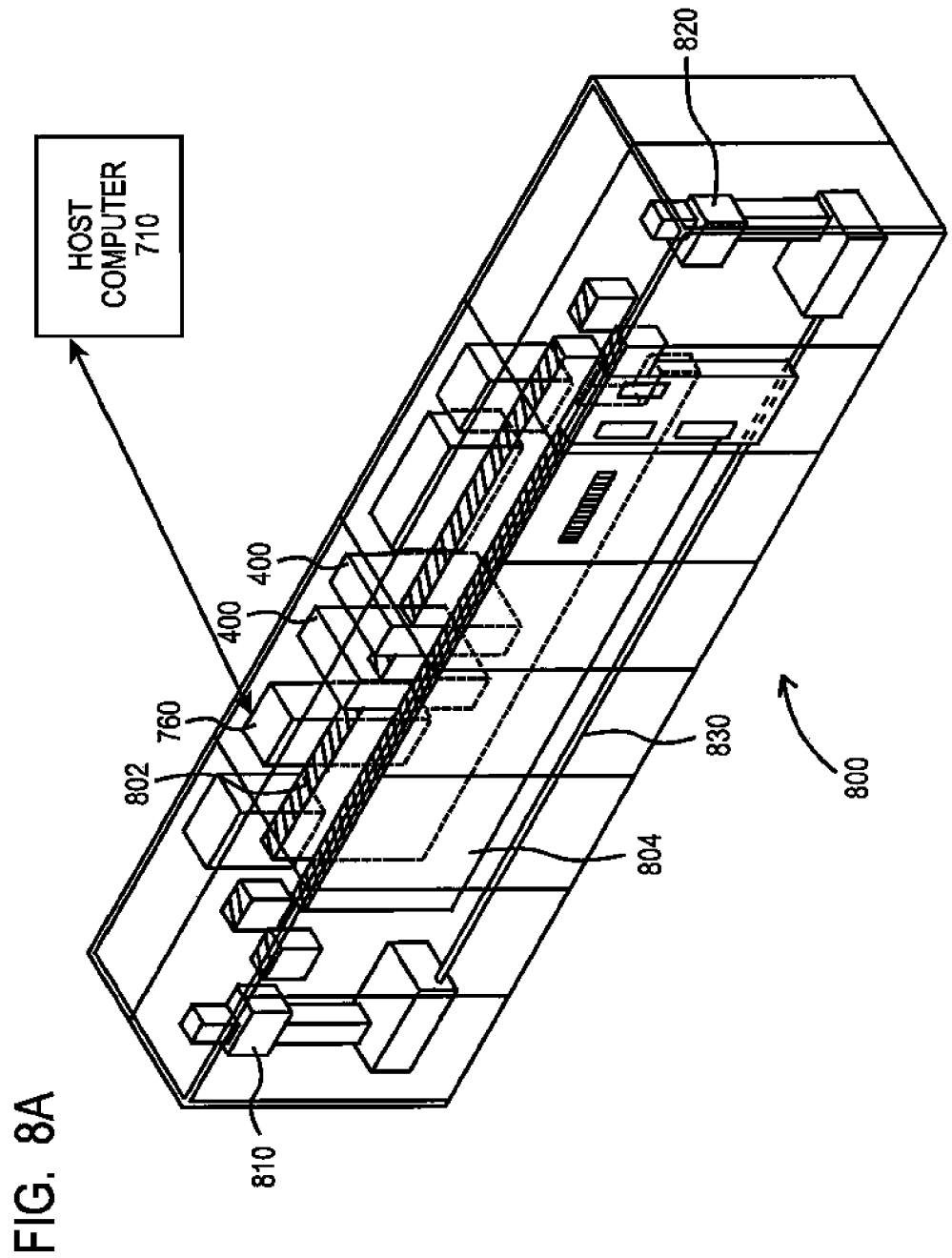

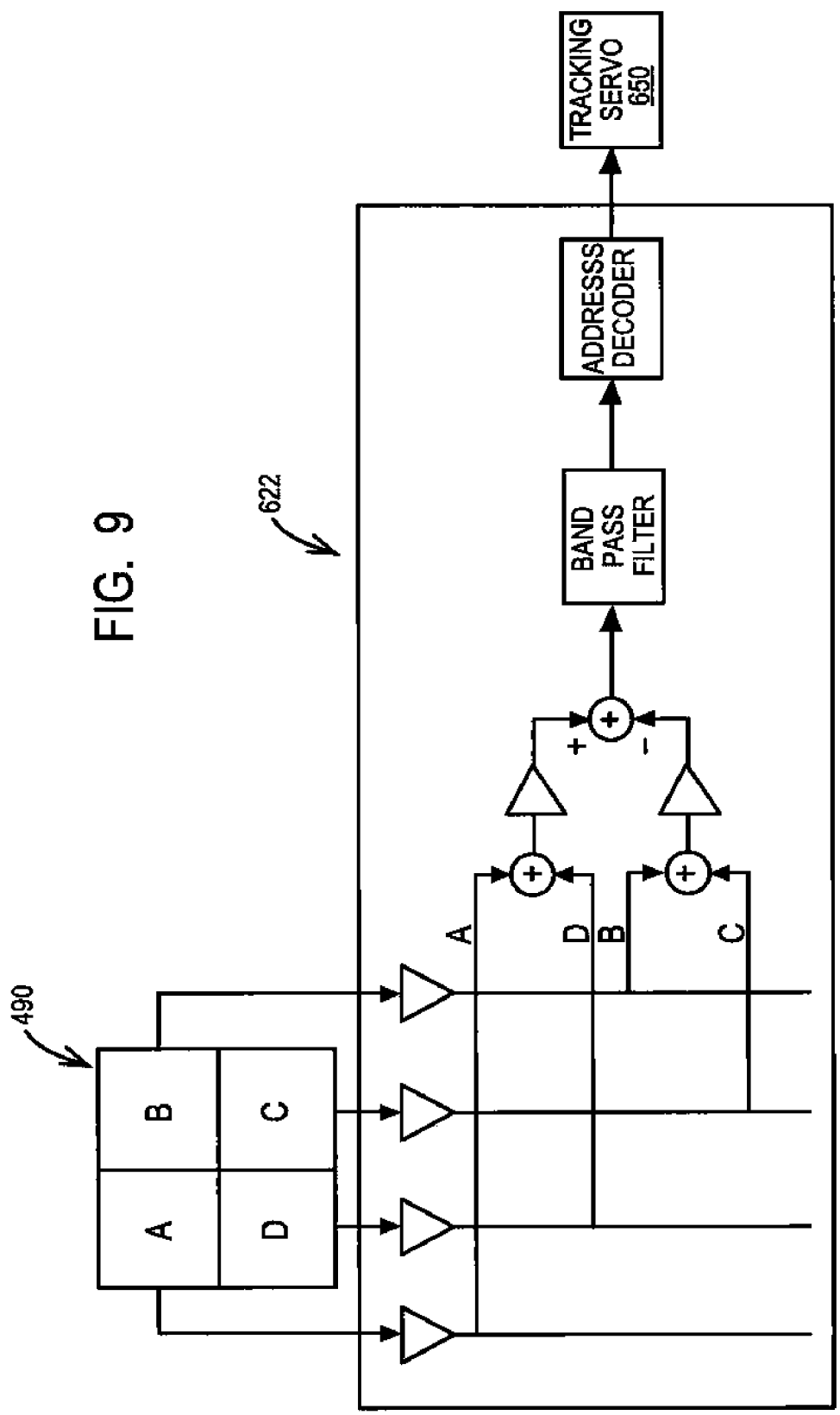

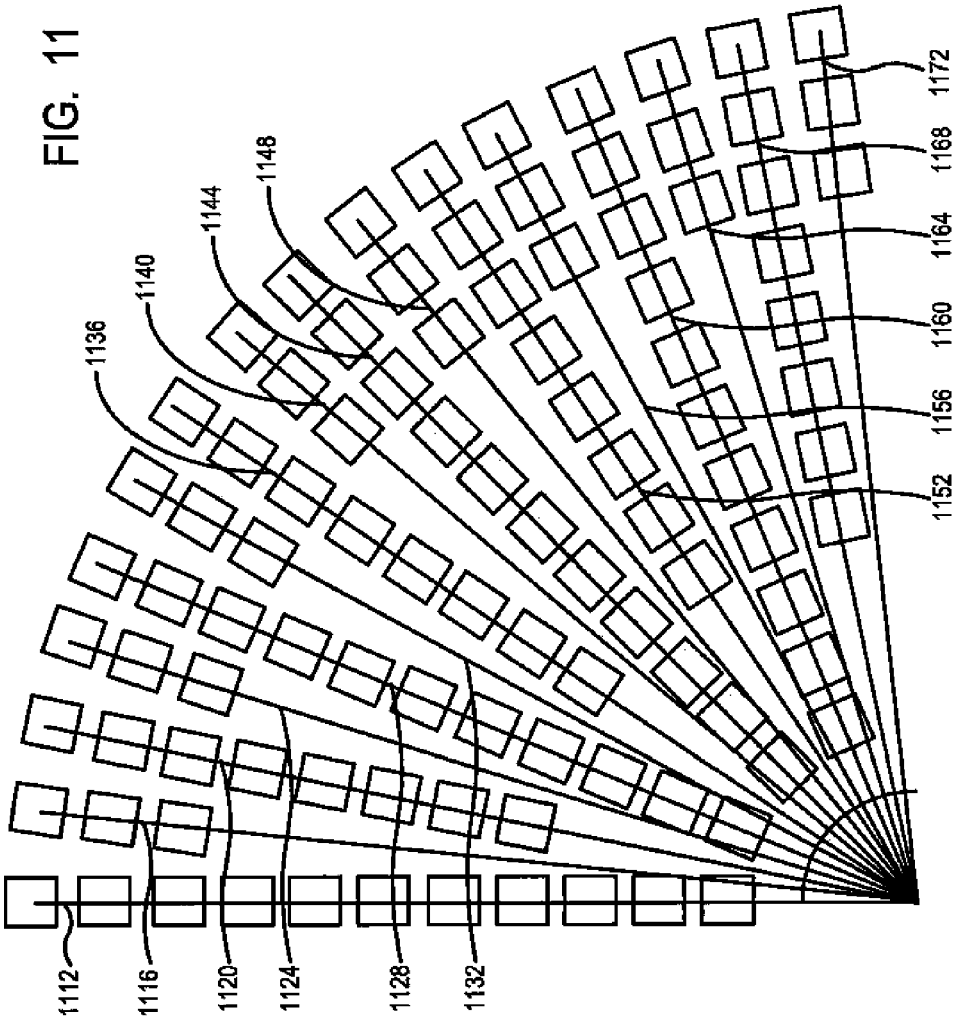

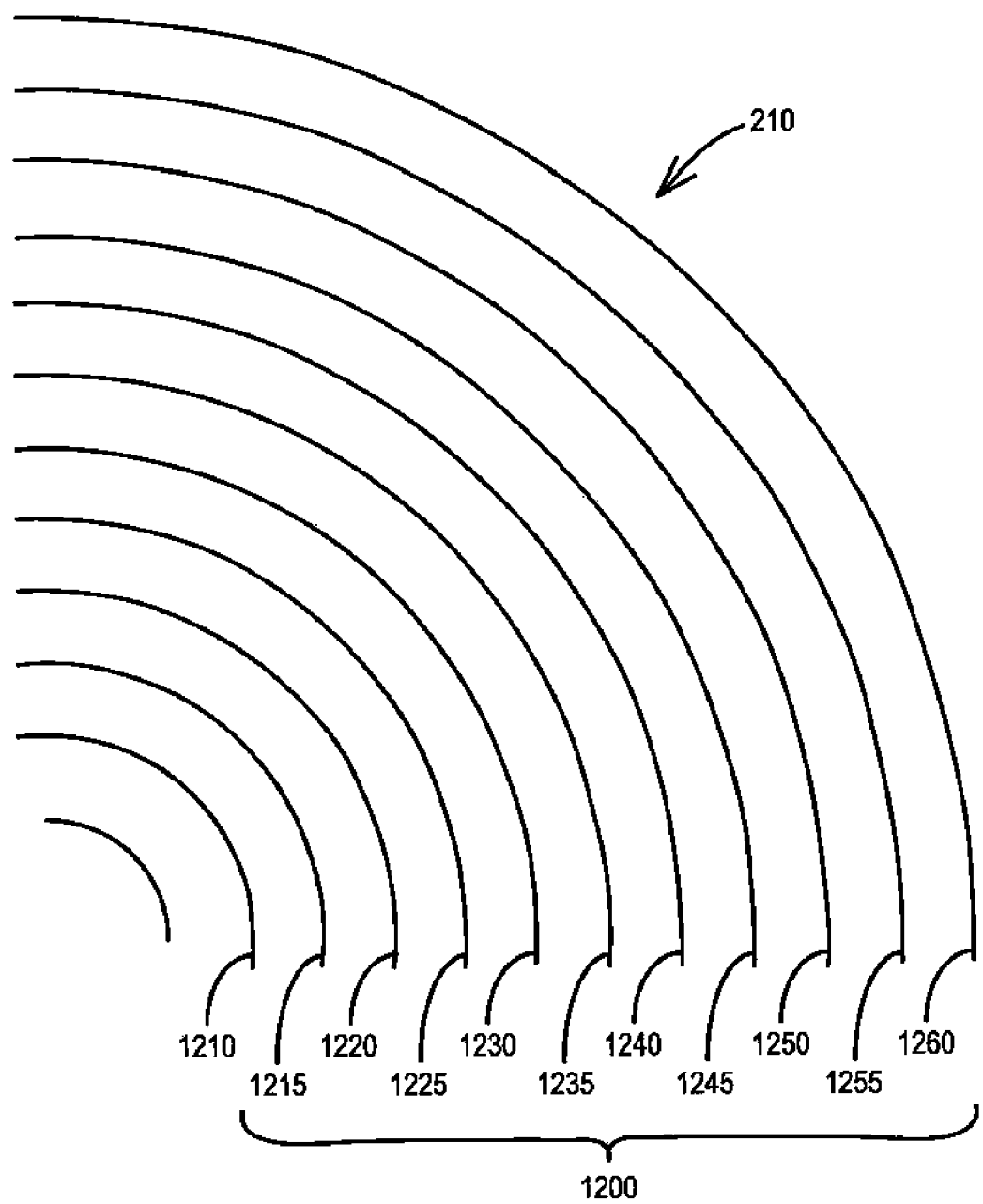

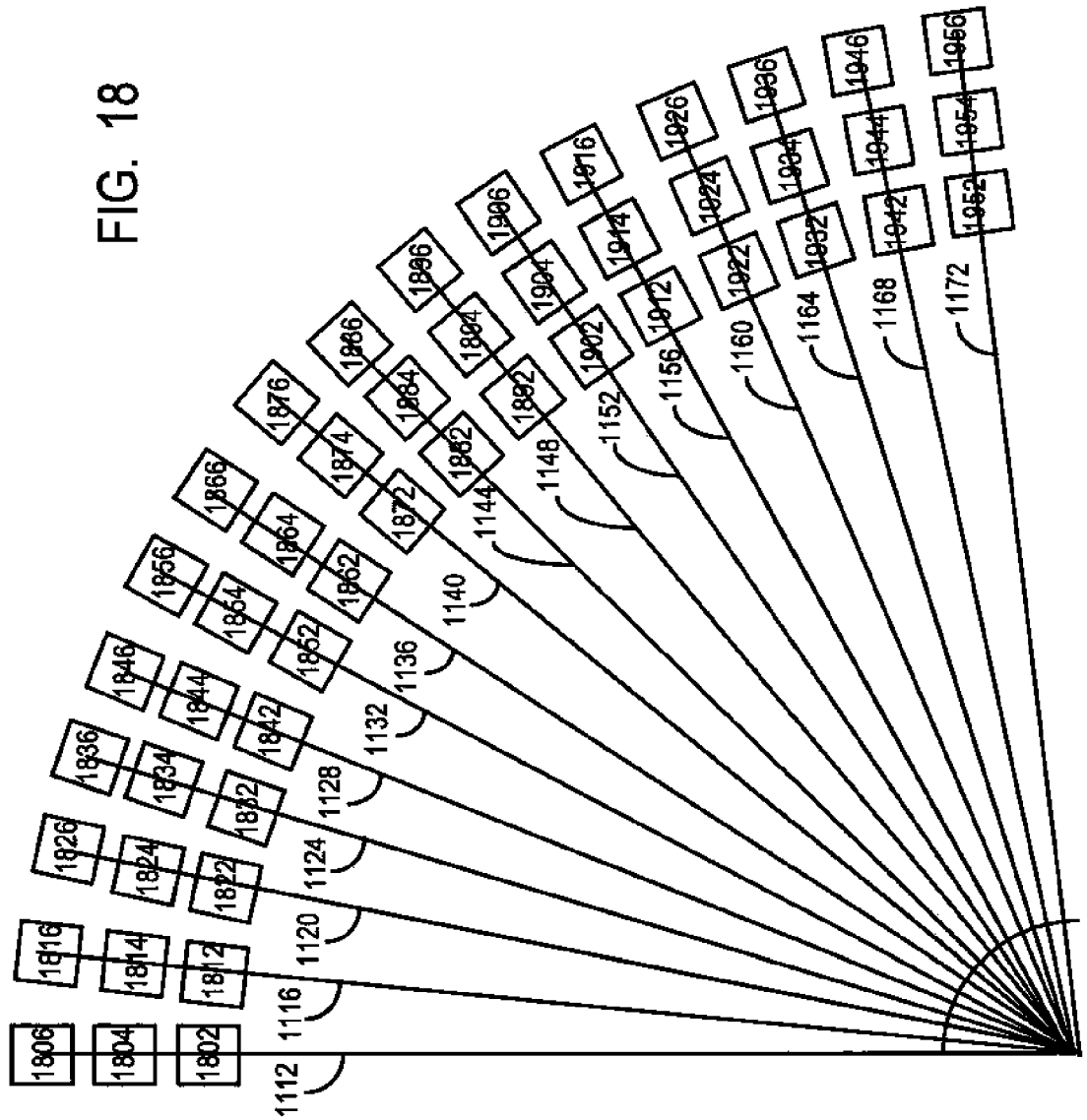

PORTABLE DATA STORAGE ASSEMBLY HAVING A HOLOGRAPHIC DATA STORAGE LAYER AND AN OPTICAL TRACKING LAYER

FIELD OF THE INVENTION

This invention relates to a portable data storage assembly having a holographic data storage layer and an optical tracking layer.

BACKGROUND OF THE INVENTION

In holographic information storage, an entire page of information is stored at once as an interference pattern within a thick, photosensitive material comprising a holographic data storage layer. This is done by intersecting two coherent laser beams within the storage layer. The first, called the data beam, contains the information to be stored; the second, called the reference beam, is designed to be simple to reproduce, for example a simple collimated beam with a planar wavefront.

The resulting interference pattern causes chemical and/or physical changes in the photosensitive medium: a replica of the interference pattern is stored as a change in the absorption, refractive index, or thickness of the photosensitive medium.

When the stored interference pattern is illuminated with one of the two waves that were used during recording, some of this incident light is diffracted by the stored interference pattern in such a fashion that the other wave is reconstructed. Illuminating the stored interference pattern with the reference wave reconstructs the data beam, and vice versa.

SUMMARY OF THE INVENTION

Applicants' invention comprises a portable data storage assembly. The portable data storage assembly comprises a holographic data storage layer and an optical tracking layer comprising addressing information for the holographic data storage layer, wherein that addressing information defines a first storage band comprising a first plurality of storage addresses and a second storage band comprising a second plurality of storage addresses, wherein said second plurality of storage address is greater than said first plurality of storage addresses.

BRIEF DESCRIPTION OF THE DRAWINGS

The invention will be better understood from a reading of the following detailed description taken in conjunction with the drawings in which like reference designators are used to designate like elements, and in which:

FIG. 8A is a block diagram showing a second embodiment of Applicants' data storage and retrieval system;

FIG. 9 illustrates certain components and signal processing circuitry disposed in the drive controller of FIG. 6;

FIG. 11 illustrates a plurality of radial columns of storage addresses disposed in the holographic data storage layer of the portable data storage assembly of FIG. 1;

FIG. 12A is a top view of a plurality of circular tracking grooves disposed in the optical tracking layer of the portable data storage assembly of FIG. 1;

FIG. 18 illustrates a third plurality of storage addresses disposed in a third storage band disposed in a quadrant of the holographic data storage layer portion of the portable data storage assembly of FIG. 1.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
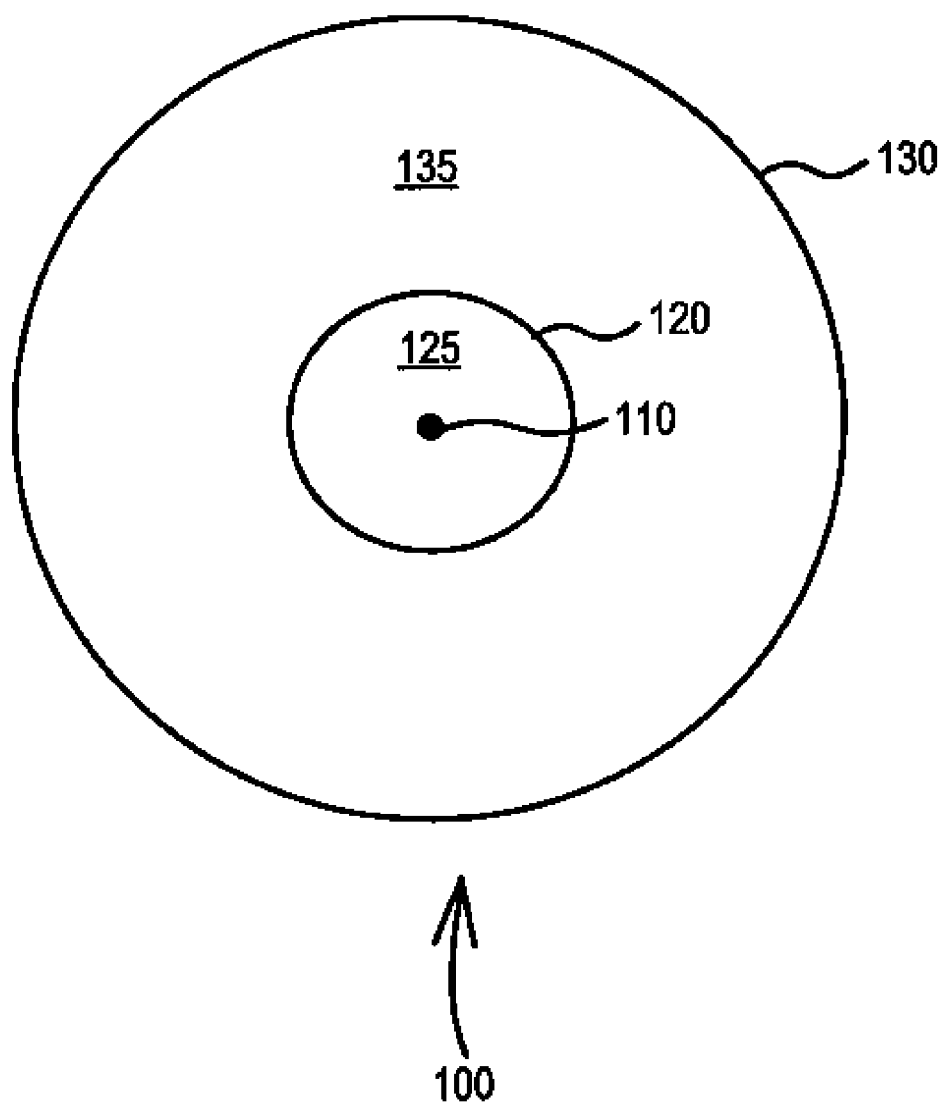
FIG. 1 is top view of Applicants' portable data storage assembly.

FIG. 1 illustrates portable data storage assembly 100, wherein portable data storage assembly 100 comprises an integral optical tracking layer. Portable data storage assembly 100 further comprises a center point 110 (FIGS. 1, 10A, 10B, 14), an inner diameter 120, and a peripheral edge 130. Non-data portion 125 of portable data storage assembly 100 is disposed between center 110 and inner diameter 120. Data portion 135 of portable data storage assembly 100 is disposed between center inner diameter 120 and peripheral edge 130.

Figure 2:
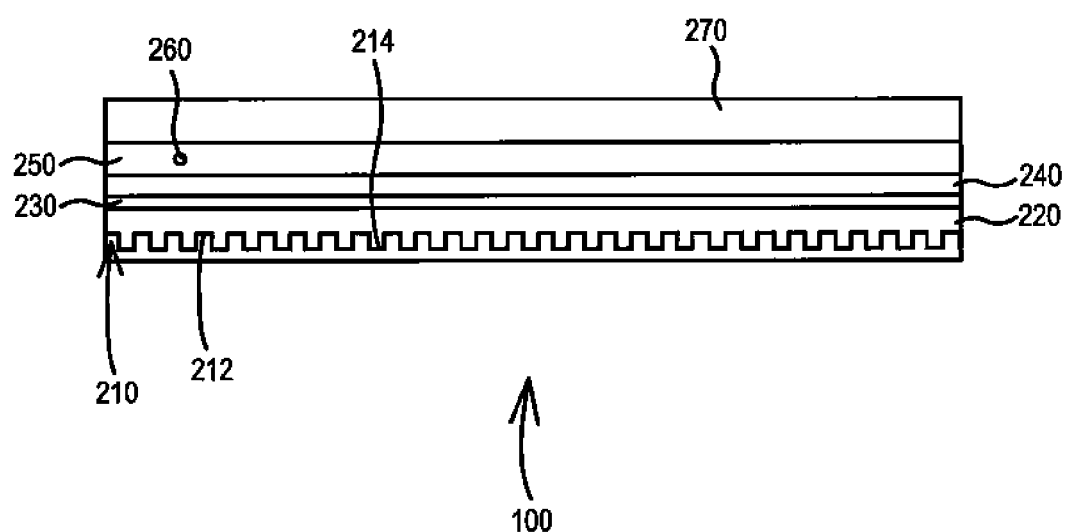
FIG. 2 is a cross-sectional view of the portable data storage assembly of FIG. 1.

Referring now to FIG. 2, Applicants' portable data storage assembly 100 comprises optical tracking layer 210 (FIGS. 2, 12A, 12B, 13, 14, 15). In certain embodiments, optical data storage layer 210 comprises alternating lands 212 and grooves 214. The alternating lands and grooves are used for tracking purposes when coding data into, or decoding data from, holographic data storage layer 250.

In the illustrated embodiment of FIG. 2, Applicants' portable data storage assembly 100 further comprises gap layer 220 disposed over optical tracking layer 210 (FIGS. 2, 12A, 12B, 13, 14, 15). In the illustrated embodiment of FIG. 2, Applicants' portable data storage assembly 100 further comprises dichronic mirror 230 disposed over gap layer 220. Applicants' dichronic mirror 230 reflects light comprising certain wavelengths, but transmits light having other wavelengths. More specifically, dichronic mirror 230 reflects the laser light emitted by first lasing device 405 (FIGS. 3, 4, 5, 6) but does not reflect the laser light emitted by second lasing device 480 (FIGS. 3, 4, 5, 6).

By "reflects the laser light" or "is reflected by," Applicants mean that less than about 10 percent of the laser energy incident on Applicants' dichronic mirror is transmitted through that dichronic mirror. By "does not reflect the laser light" or "is not reflected by," Applicants mean that more than about 90 percent of the laser energy incident on Applicants' dichronic mirror is transmitted through that dichronic mirror.

In the illustrated embodiment of FIG. 2, Applicants' portable data storage assembly 100 (FIGS. 1, 2, 3, 4, 5, 6) further comprises gap layer 240 disposed over dichronic mirror 230. In the illustrated embodiment of FIG. 2, Applicants' portable data storage assembly 100 further comprises holographic data storage layer 250 disposed over gap layer 240. In the illustrated embodiment of FIG. 2, Applicants' portable data storage assembly 100 further comprises cover layer 270 disposed over holographic data storage layer 250. The illustrated embodiment of FIG. 2 shows a hologram encoded as an interference pattern 260 (FIGS. 2, 3, 4, 5) within holographic data storage layer 250.

Figure 3:
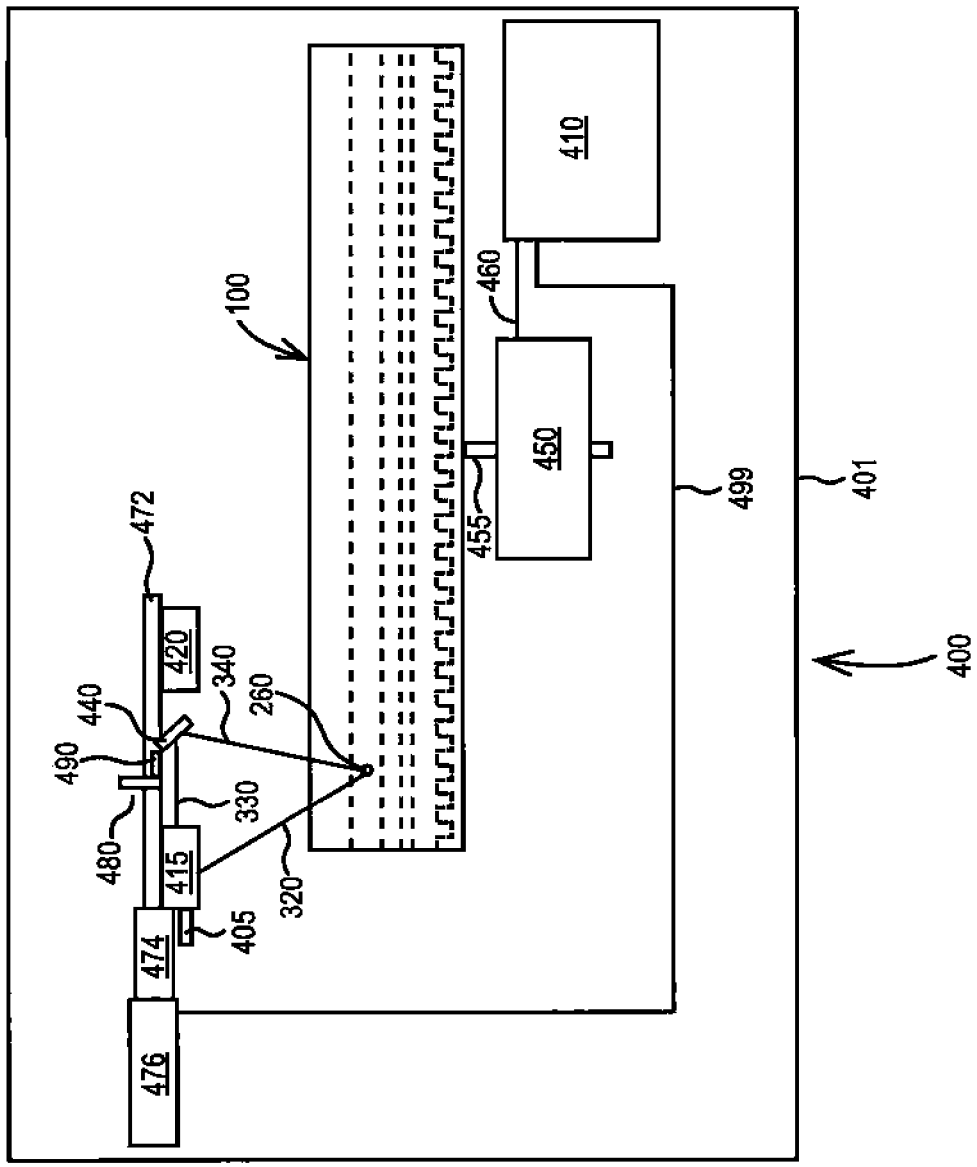
FIG. 3 is a block diagram showing Applicants' data drive assembly encoding information in the holographic data storage layer of the portable data storage assembly of FIG. 1 removeably disposed therein.

Referring now to FIG. 3, data drive 400 (FIGS. 3, 4, 5, 7, 8A) comprises housing 401, first lasing device 405 (FIGS. 3, 4, 5, 6), second lasing device 480, beam splitter 415 (FIGS. 3, 4, 5, 6), reflective spatial light modulator 440 (FIGS. 3, 4, 5, 6), first optical sensor 420 (FIGS. 3, 4, 5, 6), and second optical sensor 490 (FIGS. 3, 4, 5, 6, 9). Portable data storage assembly 100 (FIGS. 1, 2, 3, 4, 5, 6) can be removeably disposed within housing 401. In the illustrated embodiment of FIG. 3, portable data storage assembly 100 is releasably attached to a drive mechanism comprising drive motor 450 and rotatable shaft 455. Drive motor 450 rotates rotatable shaft 455.

In certain embodiments, reflective spatial light modulator 440 comprises an assembly comprising a plurality of micro mirrors. In other embodiments, reflective spatial light modulator 440 comprises a liquid crystal on silicon ("LCOS") display device. In contrast to nematic twisted liquid crystals used in LCDs, in which the crystals and electrodes are sandwiched between polarized glass plates, LCOS devices have the liquid crystals coated over the surface of a silicon chip. The electronic circuits that drive the formation of the image are etched into the chip, which is coated with a reflective (aluminized) surface. The polarizers are located in the light path both before and after the light bounces off the chip. LCOS devices are easier to manufacture than conventional LCD displays. LCOS devices have higher resolution because several million pixels can be etched onto one chip. LCOS devices can be much smaller than conventional LCD displays.

In the illustrated embodiment of FIG. 3, data drive 400 (FIGS. 3, 4, 5, 7, 8A) further comprises member 472 slidably disposed within member 474, which is slidably disposed within optical head motor 476. Drive controller 410 (FIGS. 3, 4, 5, 6) can cause optical head motor 476 to extend members 474 and 472 outwardly. In the illustrated embodiment of FIG. 3, first lasing device 405 (FIGS. 3, 4, 5, 6), beam splitter 415 (FIGS. 3, 4, 5, 6), optical sensor 420 (FIGS. 3, 4, 5, 6), reflective spatial light modulator 440 (FIGS. 3, 4, 5, 6), second lasing device 480 (FIGS. 3, 4, 5, 6), and optical sensor 490 (FIGS. 3, 4, 5, 6, 9), are disposed on member 472. Member 472 in combination with beam splitter 415, reflective spatial light modulator 440, first lasing device 405, second lasing device 480, optical sensor 490, and optical sensor 420, comprise a moveable optical head.

In certain embodiments, first lasing device 405 (FIGS. 3, 4, 5, 6) emits blue laser light. In certain embodiments, first lasing device 405 comprises a gallium nitride laser and emits blue laser light having a wavelength of about 473 nm. In certain embodiments, first laser device 405 emits blue laser light having a wavelength of about 405 nm.

In certain embodiments, second lasing device 480 (FIGS. 3, 4, 5, 6) emits red laser light. In certain embodiments, second lasing device 480 (FIGS. 3, 4, 5, 6) comprises an AlGaInP laser which emits light having a wavelength between about 620-690 nm.

In the illustrated embodiment of FIG. 3, data drive 400 (FIGS. 3, 4, 5, 7, 8A) further comprises drive controller 410 (FIGS. 3, 4, 5, 6) which communicates with drive motor 450 via control line 460 and optical head motor 476 via control line 499.

FIG. 3 shows data drive 400 (FIGS. 3, 4, 5, 7, 8A) being used to encode a hologram as interference pattern 260 (FIGS. 2, 3, 4, 5) in portable data storage assembly 100 (FIGS. 1, 2, 3, 4, 5, 6). The light generated by first lasing device 405 (FIGS. 3, 4, 5, 6) is split by beam splitter 415 into reference beam 320, and carrier beam 330.

An image comprising information is displayed on reflective spatial light modulator (RSLM) 440. Carrier beam 330 is directed onto, and is reflected from, RSLM 440 to form reflected data beam 340 comprising the image. Reference beam 320 interferes with data beam 340 to form a hologram. That hologram is encoded in portable data storage assembly 100 (FIGS. 1, 2, 3, 4, 5, 6) as an interference pattern 260 (FIGS. 2, 3, 4, 5). That optical interference pattern causes chemical and/or physical changes in the photosensitive holographic data storage layer 250 (FIG. 2, 10A, 10B). The interference pattern is encoded within holographic data storage layer 250 as a change in the absorption, refractive index, and/or thickness of the photosensitive medium.

Figure 4:
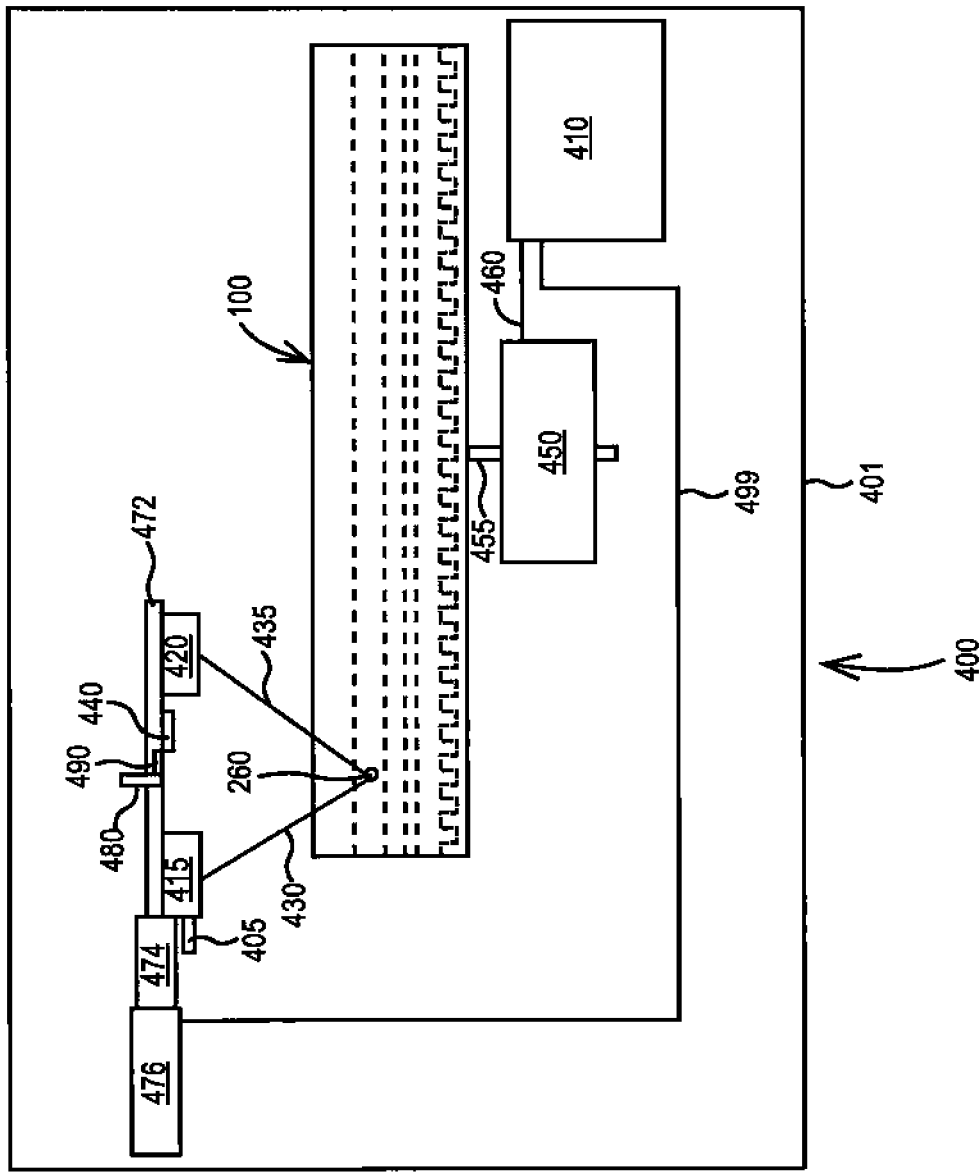
FIG. 4 is a block diagram of the data drive of FIG. 3 reading data encoded in the holographic data storage layer of the portable data storage assembly of FIG. 1.

FIG. 4 shows data drive 400 (FIGS. 3, 4, 5, 7, 8A) being used to decode interference pattern 260 (FIGS. 2, 3, 4, 5). To decode interference pattern 260, reference beam 430 is incident on the encoded holographic data storage layer 250 (FIG. 2, 10A, 10B). As the reference beam 430 interacts with interference pattern 260, a reconstructed data beam 435 is generated, wherein that reconstructed data beam 435 comprises a reconstructed image similar to the original image displayed on RSLM 440.

Reconstructed data beam 435 is projected onto optical sensor 420. Optical sensor 420 comprises a plurality of detector elements. Optical sensor 420 digitally captures the information comprising the reconstructed image of the reconstructed data beam 435, and provides that information to drive controller 410. In certain embodiments, drive controller 410 provides the information to a storage controller, such as for example storage controller 760 (FIG. 7).

Figure 5:
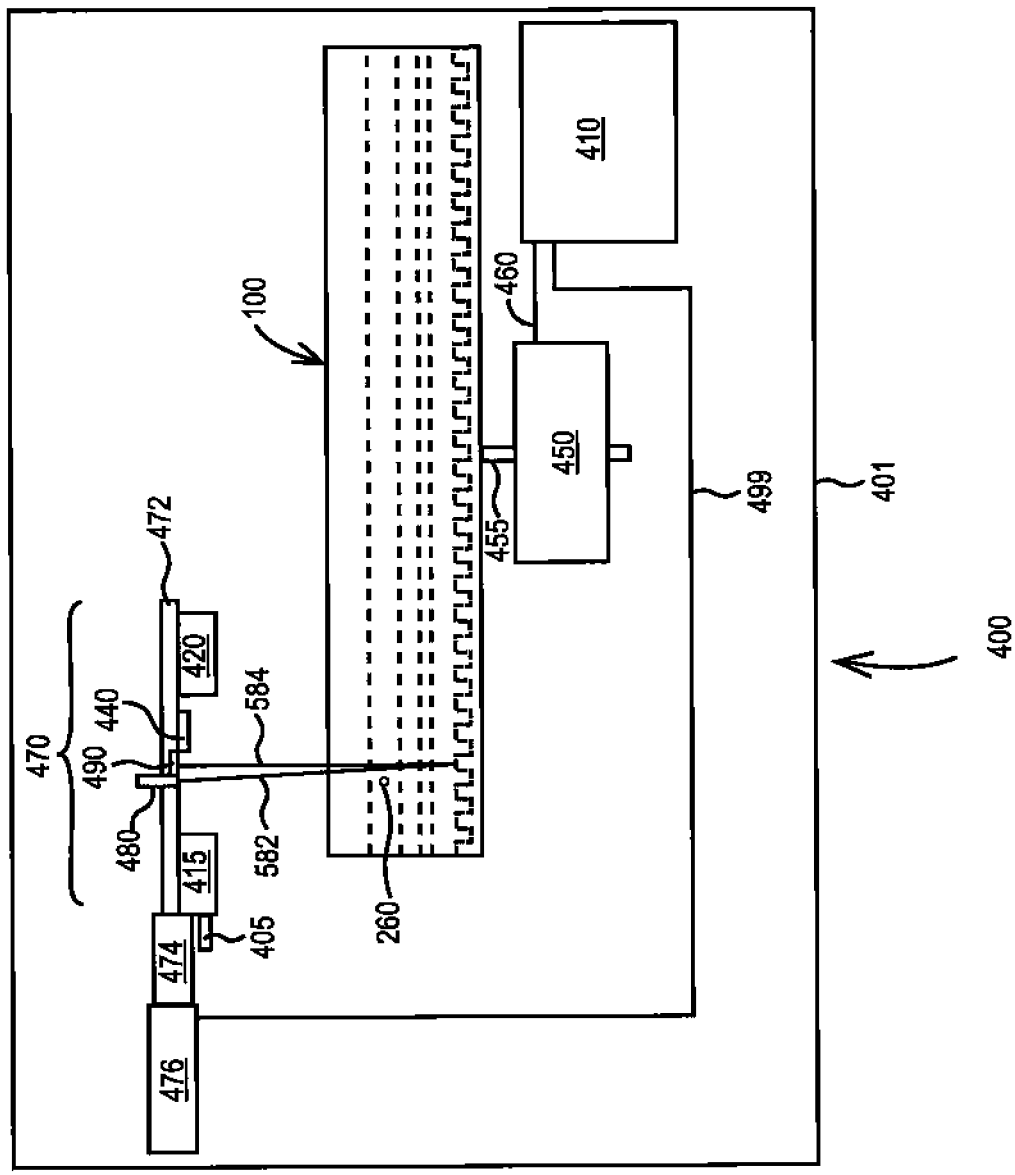
FIG. 5 is a block diagram showing the data drive of FIG. 3 reading addressing information from the optical tracking layer of the portable data storage assembly of FIG. 1.

In the illustrated embodiment of FIG. 5, drive controller 410 (FIGS. 3, 4, 5, 6) utilizes lasing device 480 (FIGS. 3, 4, 5, 6) to read address information encoded in optical tracking layer 210 (FIGS. 2, 12A, 12B, 13, 14, 15). Lasing device 480, using laser energy 582 (FIG. 5), scans optical tracking layer 210. Dichronic mirror layer 230 (FIG. 2) is transparent to the laser energy 582 provided by lasing device 480, and that laser energy 582 passes through dichronic mirror layer 230 and strikes optical tracking layer 210. Drive controller 410 (FIGS. 3, 4, 5, 6) causes optical head 470 to move along one or more of the three orthogonal axes, and as optical head 470 moves the laser light 582 incident on optical tracking layer 210 (FIGS. 2, 12A, 12B, 13, 14, 15) is selectively reflected backwardly as reflected laser light 584. The three orthogonal axes are typically radial, tangential, and vertical, and comprise a cylindrical coordinate system (R, $\vartheta$, Z). The radial direction is typically associated with optical head 470 seeking across portable data storage assembly 100 (FIGS. 1, 2, 3, 4, 5, 6), and the vertical direction is often associated with focusing the light from lasing device 480. Sensor 490 detects both the presence or absence of reflected laser light 584.

Figure 7:
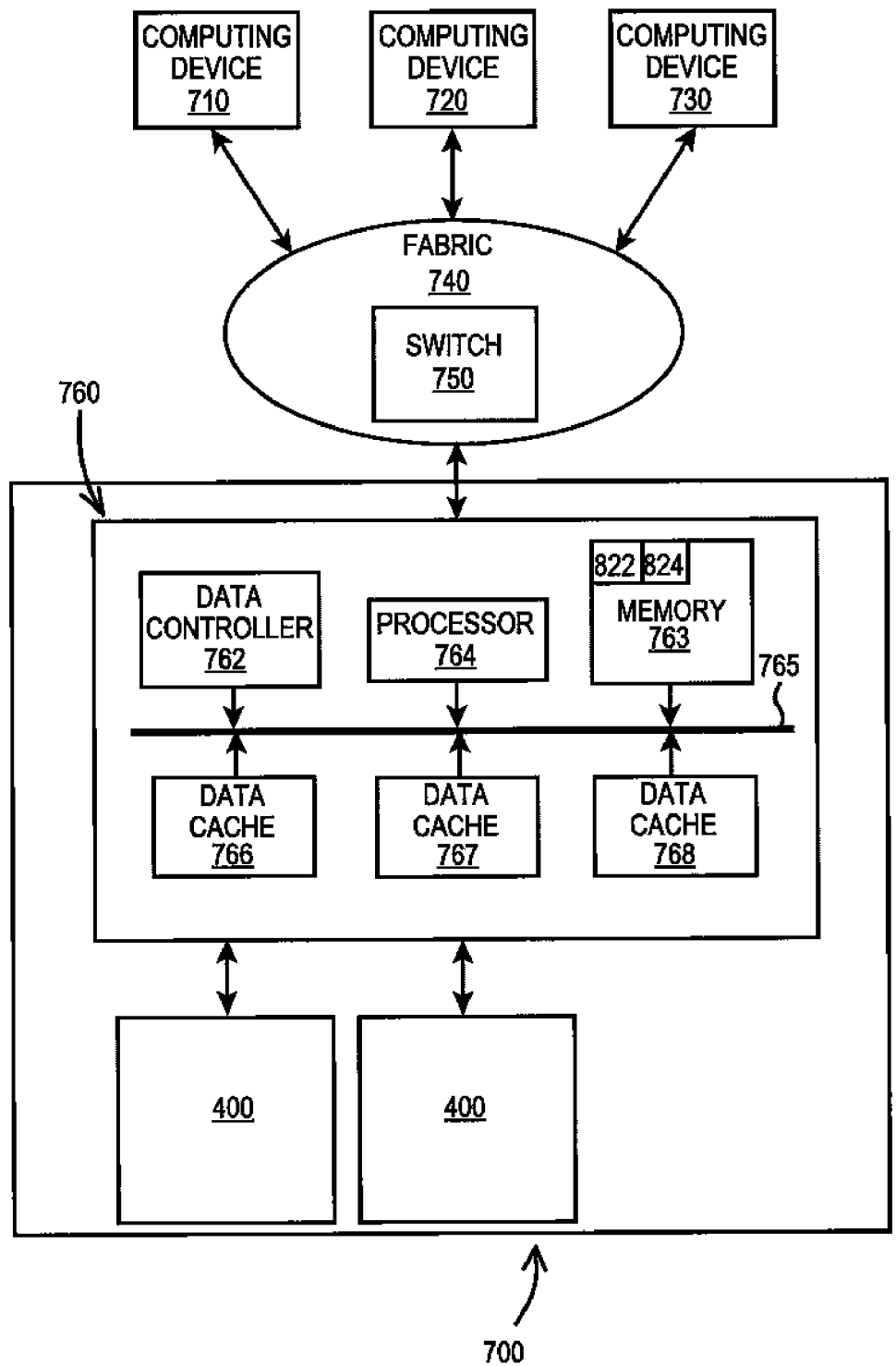
FIG. 7 is a block diagram showing one embodiment of Applicants' data storage and retrieval system.

FIG. 7 illustrates one embodiment of Applicants' data storage and retrieval system, namely system 700. In the illustrated embodiment of FIG. 7, data storage and retrieval system 700 communicates with computing devices 710, 720, and 730. In the illustrated embodiment of FIG. 7, computing devices 710, 720, and 730 communicate with storage controller 760 through a data communication fabric 740. In certain embodiments, fabric 740 comprises one or more data switches 750. Further in the illustrated embodiment of FIG. 7, storage controller 760 communicates with one or more holographic data storage systems. In the illustrated embodiment of FIG. 7, data storage and retrieval system 700 comprises data drive 400 (FIGS. 3, 4, 5, 7, 8A).

In certain embodiments, computing devices 710, 720, and 730, are selected from the group consisting of an application server, a web server, a work station, a host computer, or other like device from which information is likely to originate. In certain embodiments, one or more of computing devices 710, 720, and/or 730 are interconnected with fabric 740 using Small Computer Systems Interface ("SCSI") protocol running over a Fibre Channel ("FC") physical layer. In other embodiments, the connections between computing devices 710, 720, and 730, comprise other protocols, such as Infiniband, Ethernet, Gigabit Ethernet, Fibre Channel over Ethernet, or Internet SCSI ("iSCSI"). In certain embodiments, switches 750 are configured to route traffic from the computing devices 710, 720, and/or 730, directly to the storage controller 760.

In the illustrated embodiment of FIG. 7, storage controller 760 comprises a data controller 762, memory 763, microcode 822 and instructions 824 encoded in memory 763, processor 764, and data caches 766, 767, and 768, wherein these components communicate through a data bus 765. In certain embodiments, memory 763 comprises a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

In certain embodiments, the storage controller 760 is configured to read data signals from and write data signals to a serial data bus on one or more of the computing devices 710, 720, and/or 730. Alternatively, in other embodiments the storage controller 760 is configured to read data signals from and write data signals to one or more of the computing devices 710, 720, and/or 730, through the data bus 765 and the fabric 740.

FIG. 8A shows information storage and retrieval system 800. System 800 includes one or more of Applicants' data drives 400 (FIGS. 3, 4, 5, 7, 8A). System 800 further includes one or a plurality of Applicants' portable data storage assembly 100 (FIGS. 1, 2, 3, 4, 5, 6) stored in one or a plurality of storage slots disposed in first storage wall 802 and/or second storage wall 804. System 800 also includes at least one robotic accessor 810/820 for transporting a specified portable data storage assembly 100 between a storage slot disposed in storage wall 802/804 and data drive 400 FIGS. 3, 4, 5, 7, 8A). Accessors are moveably disposed along rail 830.

Figure 8B:
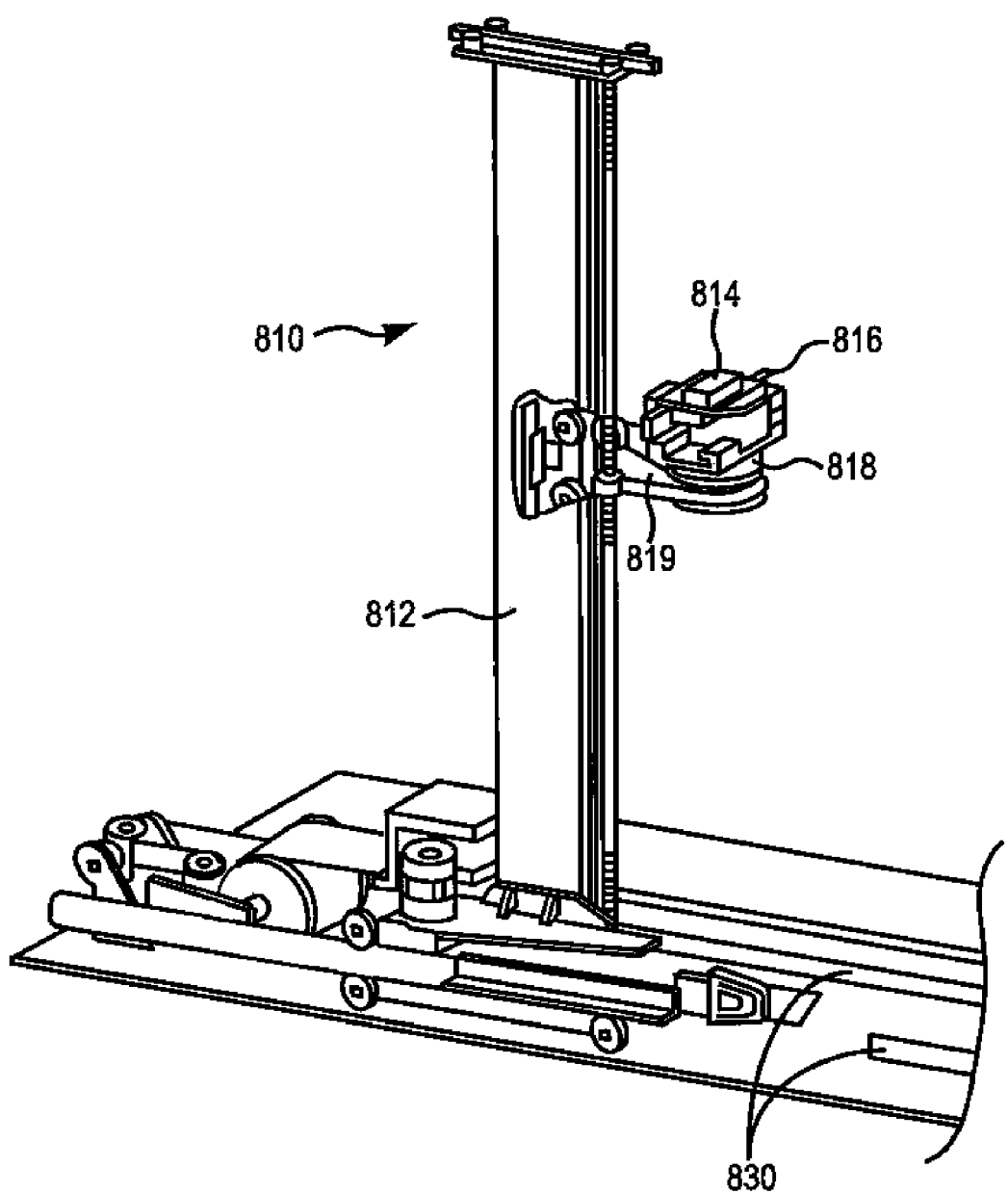
FIG. 8B is a perspective view of a robotic accessor moveably disposed in the data storage and retrieval system of FIG. 8A.

Referring now to FIGS. 8A and 8B, in certain embodiments accessors 810 and 820 each comprise vertical pillar 812, a lifting servo section 819 moveably disposed on pillar 812 and comprising bar code scanner 814, first gripper 816, and second gripper 818. In the illustrated embodiment of FIG. 8A, data storage and retrieval system 800 is in communication with host computer 710. Accessor 810 or 820 can receive a signal from host computer 710 designating one of said plurality of portable data storage assemblies, retrieve said designated portable data storage assembly from a storage slot, transport said designated portable data storage assembly to a data drive 400 (FIGS. 3, 4, 5, 7, 8A), and dispose said designated portable data storage assembly into the data drive 400.

Figure 10A:
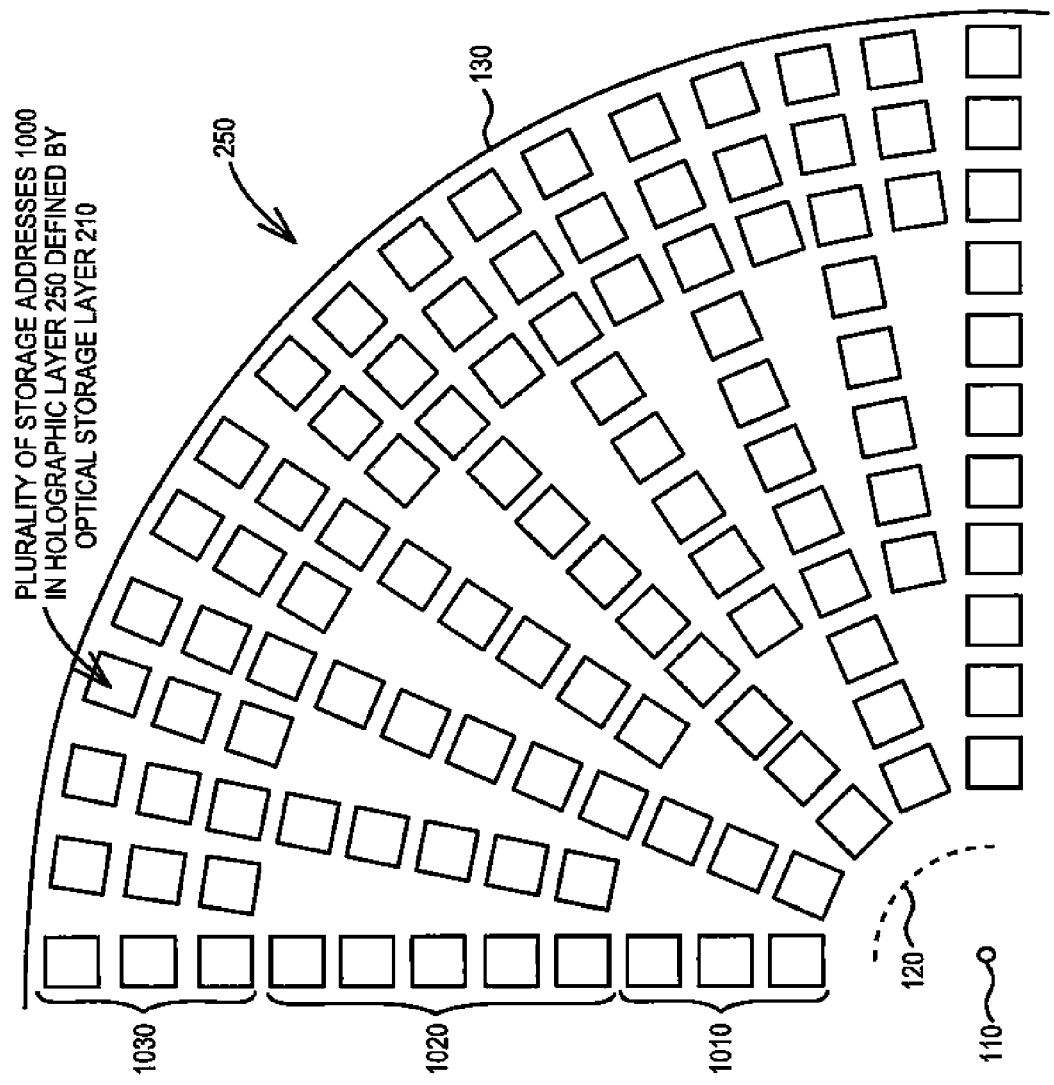
FIG. 10A is a block diagram showing a plurality of storage addresses in the holographic data storage layer of the portable data storage assembly of FIG. 1.

FIG. 10A illustrates one quadrant of Applicants' holographic data storage layer 250, and shows the locations of a plurality of storage addresses 1000, wherein that plurality of storage addresses 1000 are defined by information encoded in optical tracking layer 210 (FIGS. 2, 12A, 12B, 13, 14, 15). In the illustrated embodiment of FIG. 10A, the plurality of storage addresses 1000 are disposed in a plurality of storage bands encircling center point 110 (FIGS. 1, 10A, 10B, 14). For example, storage band 1010 comprises a first plurality of storage addresses, storage band 1020 comprises a second plurality of storage addresses, and storage band 1030 comprises a third plurality of storage addresses, wherein the second plurality of storage addresses is greater than the first plurality of storage address, and wherein the third plurality of storage addresses is greater than the second plurality of storage addresses.

Figure 10B:
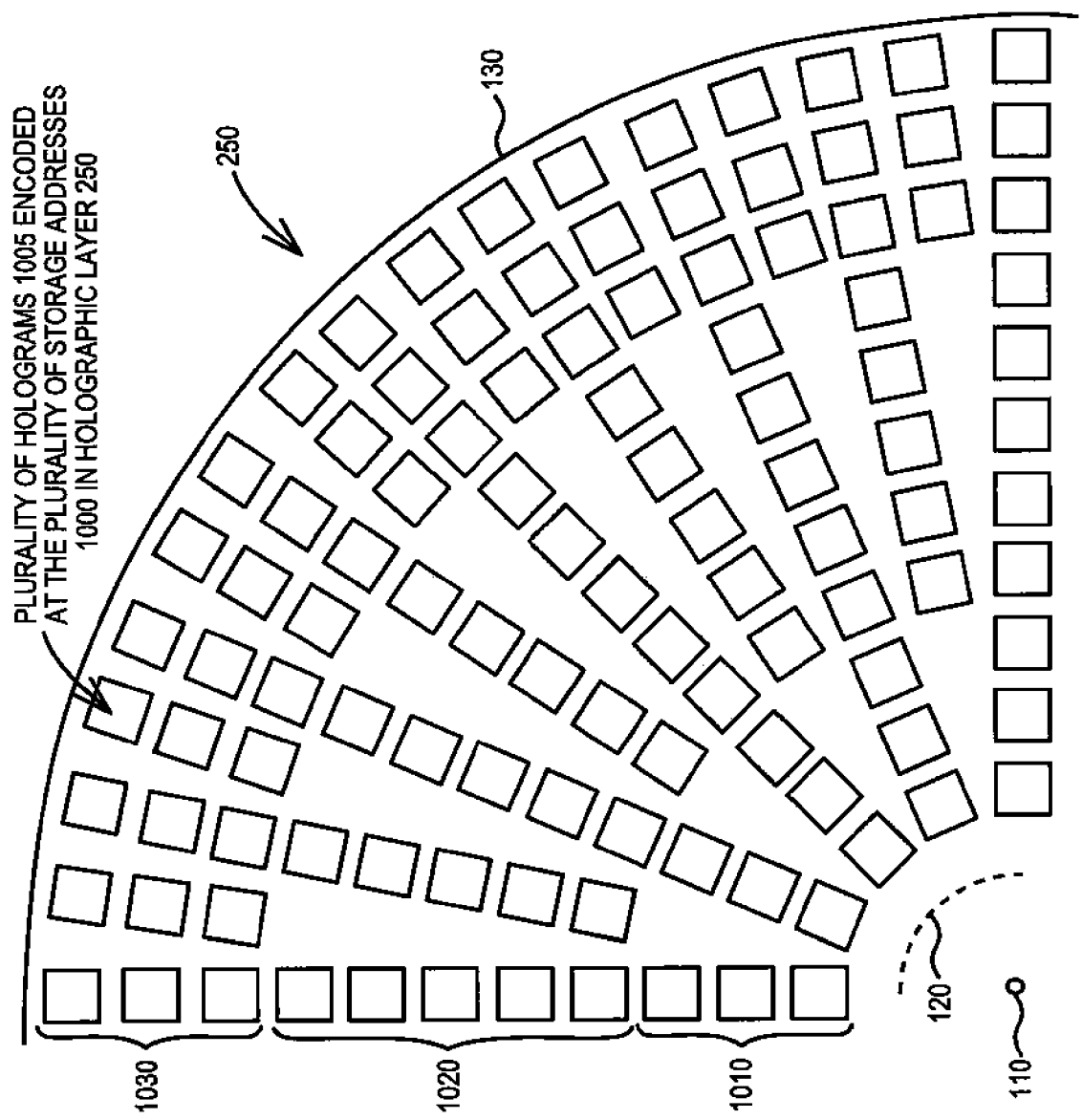
FIG. 10B is a block diagram showing a plurality of holograms encoded in the holographic data storage layer of the portable data storage assembly of FIG. 1.

FIG. 10B illustrates a quadrant of holographic data storage layer 250 wherein a plurality of holograms 1005 have been encoded at the plurality of storage addresses 1000 shown in FIG. 10A.

Referring now to FIGS. 10A and 11, in certain embodiments Applicants' first storage band comprises a first plurality storage addresses disposed along a portion of each of (N) radii, and between inner diameter 120 and periphery 130, wherein (N) is greater than or equal to 1. Applicants' second storage band comprises a second plurality storage addresses disposed along a portion of each of (2)(N) radii, and between inner diameter 120 and periphery 130. Applicants' third storage band comprises a third plurality of storage addresses disposed along a portion of each of (4)(N) radii, and between inner diameter 120 and periphery 130.

Figure 16:
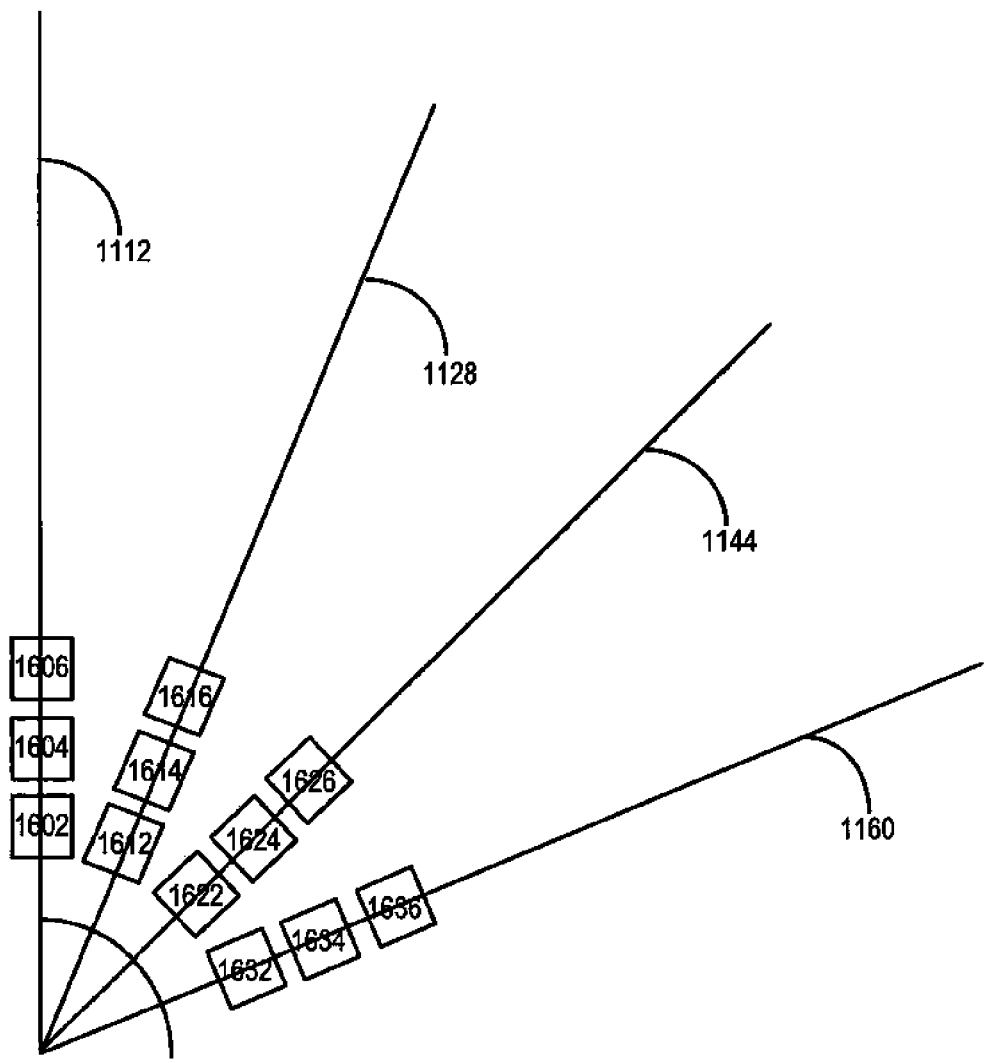
FIG. 16 illustrates a first plurality of storage addresses disposed in a first storage band disposed in a quadrant of the holographic data storage layer portion of the portable data storage assembly of FIG. 1.

Referring now to FIGS. 10A, 11, and 16, in the illustrated quadrant of holographic data storage layer 250 first storage band 1010 comprises storage addresses 1602, 1604, and 1606, disposed along a first portion of radius 1112, storage addresses 1612, 1614, and 1616, disposed along a first portion of radius 1128, storage addresses 1622, 1624, and 1626, disposed along a first portion of radius 1144, and storage addresses 1632, 1634, and 1636, disposed along a first portion of radius 1160. Those skilled in the art will appreciate that a complete storage layer 250 comprising the storage address architecture shown for one quadrant in FIG. 16 comprises a first storage band 1010 that comprises storage addresses disposed along a first portion of 16 radii.

Figure 17:
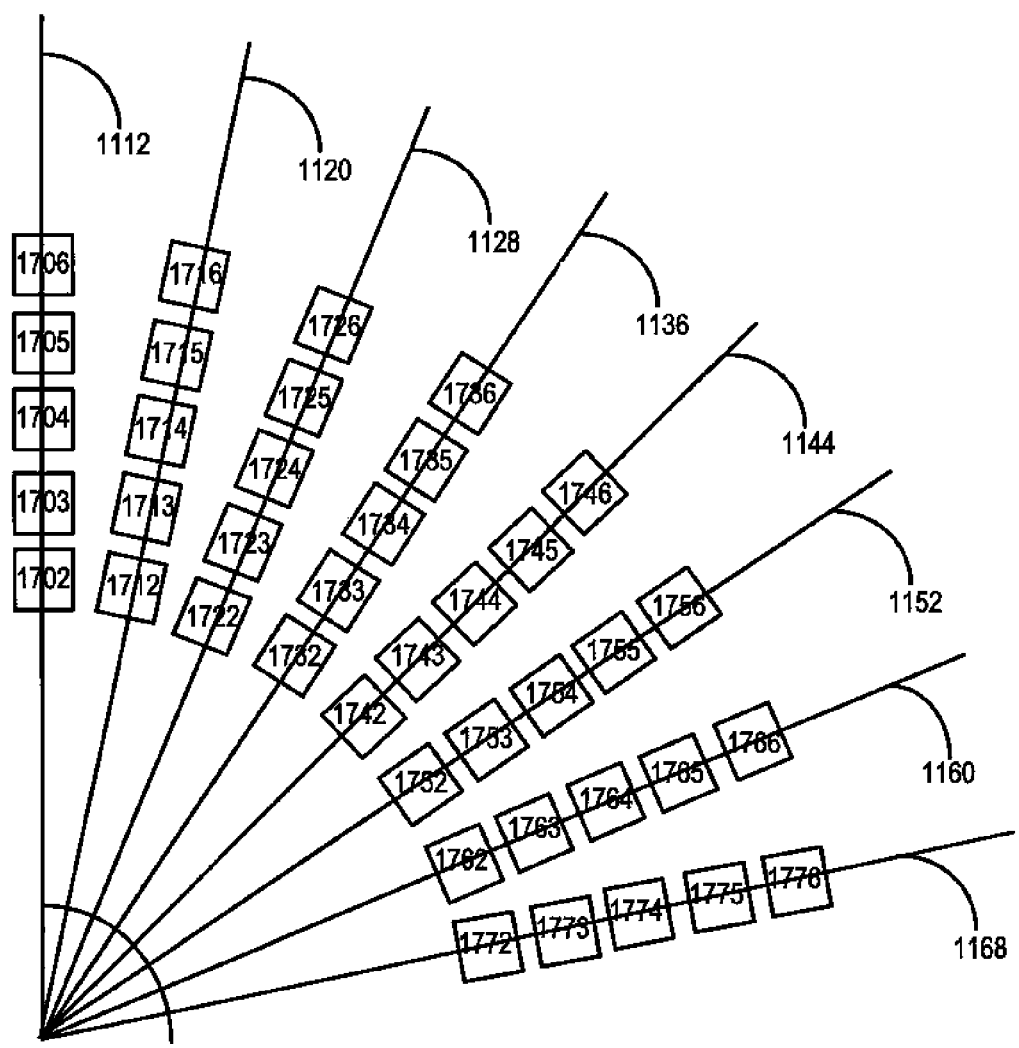
FIG. 17 illustrates a second plurality of storage addresses disposed in a second storage band disposed in a quadrant of the holographic data storage layer portion of the portable data storage assembly of FIG. 1.

Referring now to FIGS. 10A, 11, and 17, in the illustrated quadrant of holographic data storage layer 250 second storage band 1020 comprises storage addresses 1702, 1703, 1704, 1705, and 1706, disposed along a second portion of radius 1112, storage addresses 1712, 1713, 1714, 1715, and 1716, disposed along a second portion of radius 1120, storage addresses 1722, 1723, 1724, 1725, and 1726, disposed along a second portion of radius 1128, storage addresses 1732, 1733, 1734, 1735, and 1736, disposed along a second portion of radius 1136, storage addresses 1742, 1743, 1744, 1745, and 1746, disposed along a second portion of radius 1144, storage addresses 1752, 1753, 1754, 1755, and 1756, disposed along a second portion of radius 1152, storage addresses 1762, 1763, 1764, 1765, and 1766, disposed along a second portion of radius 1160, and storage addresses 1772, 1773, 1774, 1775, and 1776, disposed along a second portion of radius 1168. Those skilled in the art will appreciate that a complete storage layer 250 comprising the storage address architecture shown for one quadrant in FIG. 17 comprises a second storage band 1020 that comprises storage addresses disposed along a second portion of 32 radii.

Referring now to FIGS. 10A, 11, and 18, in the illustrated quadrant of holographic data storage layer 250 third storage band 1030 comprises storage addresses 1802, 1804, and 1806, disposed along a third portion of radius 1112, storage addresses 1812, 1814, and 1816, disposed along a third portion of radius 1116, storage addresses 1822, 1824, and 1826, disposed along a third portion of radius 1120, storage addresses 1832, 1834, and 1836, disposed along a third portion of radius 1124, storage addresses 1842, 1844, and 1846, disposed along a third portion of radius 1128, storage addresses 1852, 1854, and 1856, disposed along a third portion of radius 1132, storage addresses 1862, 1864, and 1866, disposed along a third portion of radius 1136, storage addresses 1872, 1874, and 1876, disposed along a third portion of radius 1140, storage addresses 1882, 1884, and 1886, disposed along a third portion of radius 1144, storage addresses 1892, 1894, and 1896, disposed along a third portion of radius 1148, storage addresses 1902, 1904, and 1906, disposed along a third portion of radius 1152, storage addresses 1912, 1914, and 1916, disposed along a third portion of radius 1156, storage addresses 1922, 1924, and 1926, disposed along a third portion of radius 1160, storage addresses 1932, 1934, and 1936, disposed along a third portion of radius 1164, storage addresses 1942, 1944, and 1946, disposed along a third portion of radius 1168, and storage addresses 1952, 1954, and 1956, disposed along a third portion of radius 1172. Those skilled in the art will appreciate that a complete storage layer 250 comprising the storage address architecture shown for one quadrant in FIG. 18 comprises a third storage band 1030 that comprises storage addresses disposed along a second portion of 64 radii.

Figure 12B:
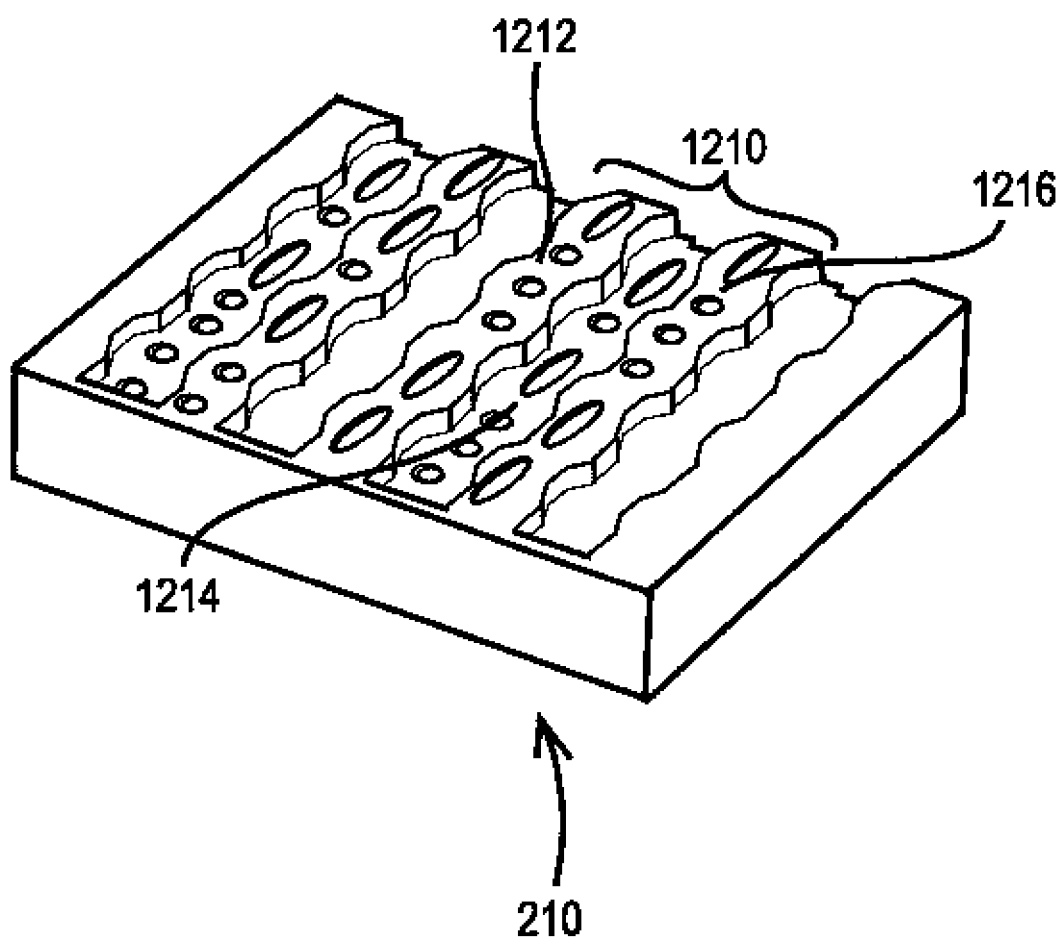
FIG. 12B is a perspective view of a wobbly track architecture used in certain embodiments of the tracking grooves of FIG. 12A.

FIG. 12A shows a quadrant of optical tracking layer 210 (FIGS. 2, 12A, 12B, 13, 14, 15), wherein that optical tracking layer comprises a plurality of tracking grooves 1200. In this illustrated quadrant portion, optical tracking layer 210 comprises tracking grooves, 1210, 1215, 1220, 1225, 1230, 1235, 1240, 1245, 1250, 1255, and 1260. Those skilled in the art will appreciate that the illustrated embodiment of FIG. 12A comprises a plurality of circular tracking grooves symmetrically disposed around center point 110 (FIGS. 1, 10A, 10B, 14).

In certain embodiments, each of the plurality of tracking grooves 1200 comprises a series of "wobble tracks." Referring now to FIG. 12B, tracking groove 1210 is shown comprising a wobble assembly comprising a wobble groove 1214 disposed between wobble lands 1212 and 1216.

Figure 13:
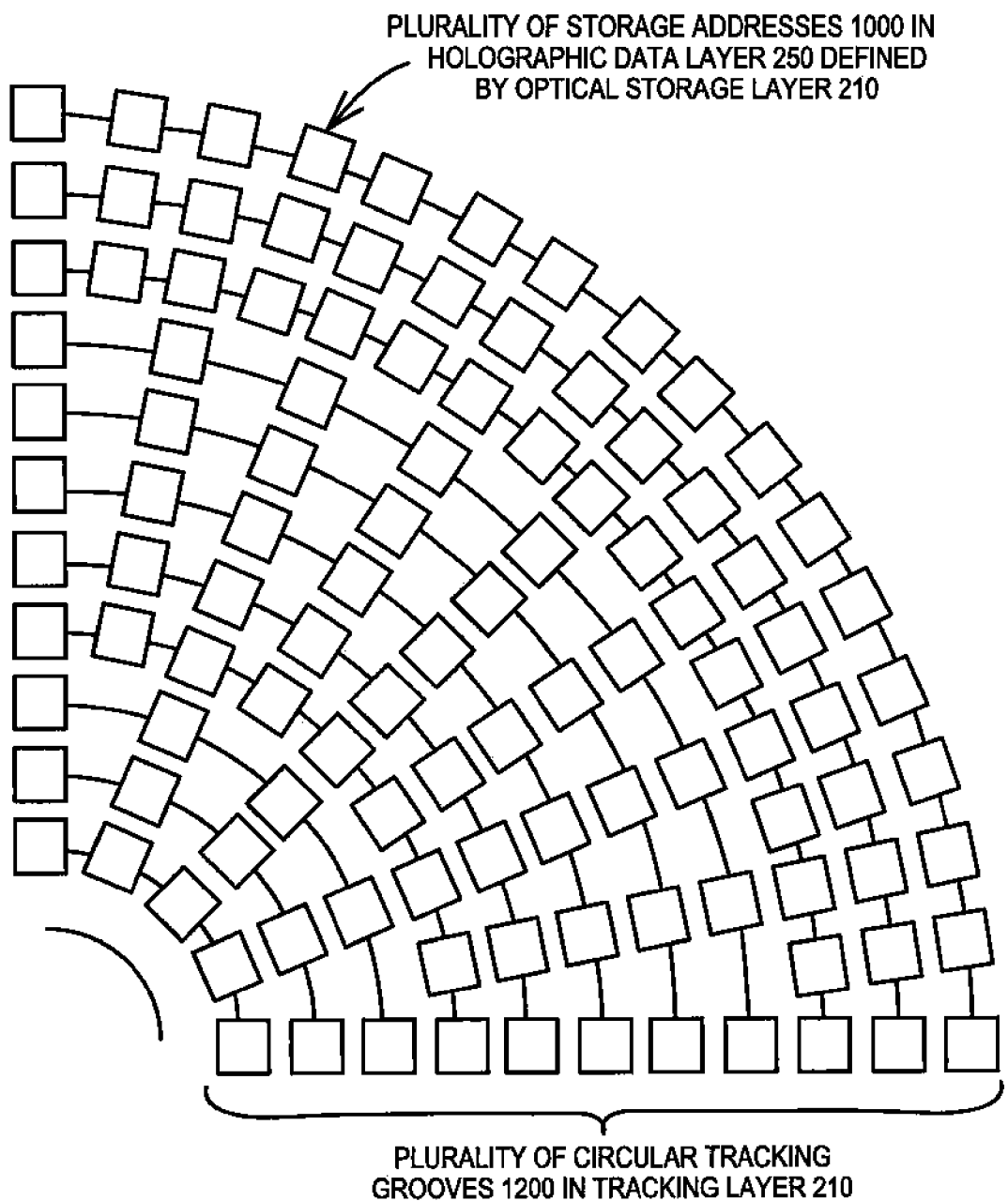
FIG. 13 illustrates an overlay of the plurality of storage addresses of FIG. 10A and the tracking grooves of FIG. 12A.

FIG. 13 comprises an overlay view of the quadrant of holographic data storage layer 250 of FIG. 10B in combination with the quadrant of optical tracking layer 210 of FIG. 12A. In the illustrated embodiment of FIG. 13, each of the plurality of holograms 1005 encoded in holographic data storage layer 250 is disposed over one of the plurality of tracking grooves 1200 disposed in optical tracking layer 210 (FIGS. 2, 12A, 12B, 13, 14, 15).

Referring now to FIGS. 5, 6, 9, and 14, Applicants' drive controller 410 (FIGS. 3, 4, 5, 6) disposed in Applicants' data drive 400 (FIGS. 3, 4, 5, 7, 8A) utilizes lasing device 480 and optical detector 490 (FIGS. 3, 4, 5, 6, 9) to obtain address information encoded in the plurality of tracking grooves 1400 disposed in optical tracking layer 210 in order to encode holograms in, and decode holograms from, holographic data storage layer 250. In the illustrated embodiment of FIG. 6, drive controller 410 comprises Actuator Position Integrated Circuit ("APIC") 610 in communication with optical head 470 (FIGS. 3, 4, 5, 6) and with processor module 620, wherein processor module 620 comprises digital signal processor 622 and microprocessor 624. Drive controller 410 further comprises focusing servo 630, focusing actuator 640, tracking servo 650, tracking actuator 670, and drive motor servo 680. Processor module 620 also contains memory 626 with instructions 628.

Figure 6:
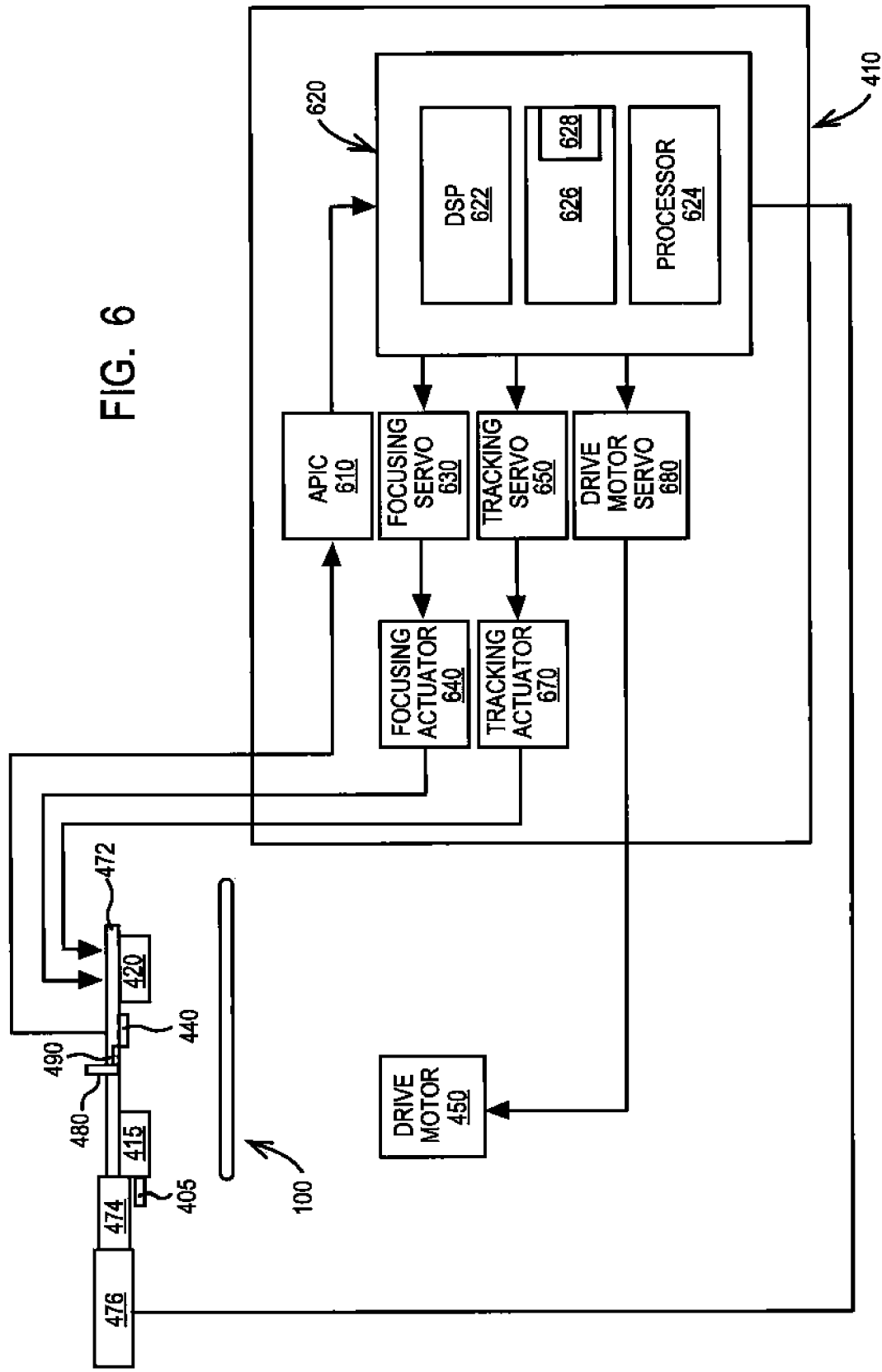
FIG. 6 illustrates a drive controller disposed in the data drive of FIG. 3.

FIG. 9 shows optical detector 490 in communication with signal processor 622 (FIGS. 6, 9). In the illustrated embodiment of FIG. 9, optical detector 490 (FIGS. 3, 4, 5, 6, 9) is subdivided into four areas. This optical sensor architecture makes possible obtaining a focus error signal at the same time as obtaining tracking information using a "push-pull" signal derived from the optical tracking layer portion of Applicants' portable data storage assembly 100 (FIGS. 1, 2, 3, 4, 5, 6).

Such a push-pull signal is obtained by linking the signals from optical detector 490 (FIGS. 3, 4, 5, 6, 9). Use is made of the characteristic that the scanning beam 582 (FIG. 5) which strikes Applicants' optical tracking layer 210 (FIGS. 2, 12A, 12B, 13, 14, 15) causes a so-called push-pull effect. This push-pull effect is based on the principle that a diffraction effect is formed at the edges of the tracks, so that not only is a vertical beam (so-called zero order) reflected from reflective tracking layer 210 in the direction of optical detector 490 (FIGS. 3, 4, 5, 6, 9), but higher-order beams are additionally reflected, and are not reflected precisely at right angles to the area of the tracking layer.

An objective lens portion of detector 490 (FIGS. 3, 4, 5, 6, 9) gathers only the zero order and +/−1st order reflected beams and images those beams on optical detector 490, which is subdivided into at least two areas. Destructive interference of different intensity is formed in the overlapping area between the zero order and the $+/-1^{st}$ order, depending on the track position. This destructive interference is evaluated by signal processor 622 (FIGS. 6, 9) in the form of a tracking error signal provided to tracking servo 650 (FIG. 6).

In certain embodiments, the output signals from the optical detector 490 (FIGS. 3, 4, 5, 6, 9) are linked as shown in FIG. 9. In order to obtain the tracking error signal using the push-pull effect, it is actually sufficient to subdivide optical detector 490 into a right-hand half and a left-hand half, and to subtract the output signals from these two detector halves from one another.

In the case of a four-quadrant detector, this is done by forming the logic link (A+D)−(B+C). In certain embodiments, Applicants' signal processor 622 comprises the circuitry shown in FIG. 9, wherein a push-pull signal is passed through a Band Pass Filter and then to an Address Decoder to provide a tracking error signal for tracking servo 650 (FIGS. 6, 9).

In certain embodiments, the plurality of tracking grooves 1200 (FIGS. 12A, 13, 15) comprise an interleaved spiral or concentric circles. In certain embodiments, the tracking grooves are additionally wobbled in a specific form in order to find specific positions on the medium. This means that the tracking groove is not approximately straight, rather it is molded in meandering lines. In this case, address information may be contained in the form of these meandering lines and is used for identification of a specific position on Applicants' optical tracking layer, and hence a corresponding specific position in the holographic data storage layer 250.

Figure 14:
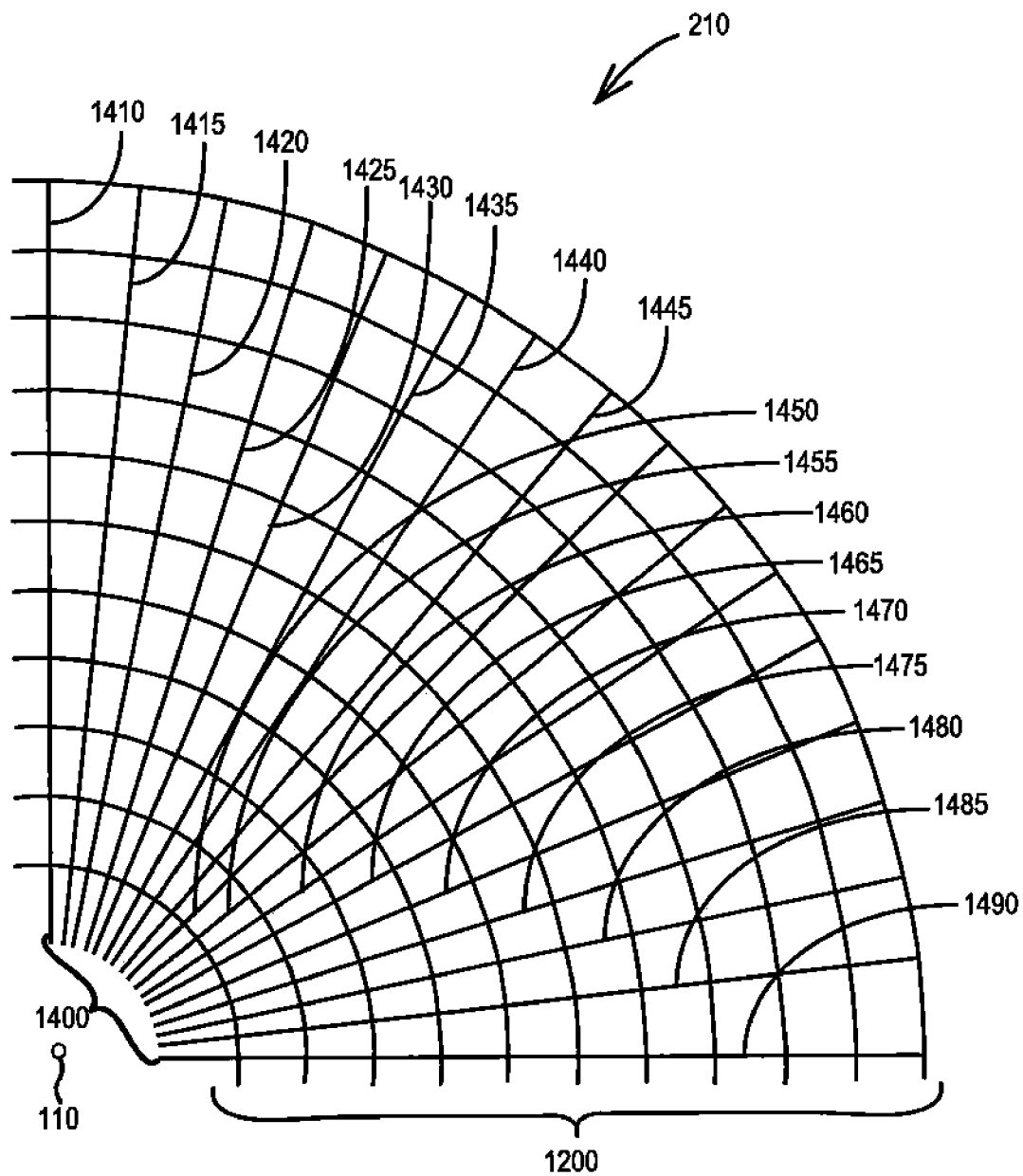
FIG. 14 illustrates a plurality of circular tracking grooves in combination with a plurality of radial tracking grooves disposed in one quadrant of the optical tracking layer of the portable data storage assembly of FIG. 1.

Referring now to FIG. 14, in certain embodiments optical tracking layer 210 (FIGS. 2, 12A, 13, 14, 15) comprises the plurality of circular tracking grooves 1200 (FIGS. 12A, 12B, 13, 15) in combination with a plurality of radial tracking grooves 1400. In the illustrated embodiment of FIG. 14, optical tracking layer comprises radial tracking grooves 1410, 1415, 1420, 1425, 1430, 1435, 1440, 1445, 1450, 1455, 1460, 1465, 1470, 1475, 1480, 1485, and 1490. In certain embodiments, each of radial tracking grooves 1410, 1415, 1420, 1425, 1430, 1435, 1440, 1445, 1450, 1455, 1460, 1465, 1470, 1475, 1480, 1485, and 1490, comprises the wobble track architecture illustrated in FIG. 12B.

Figure 15:
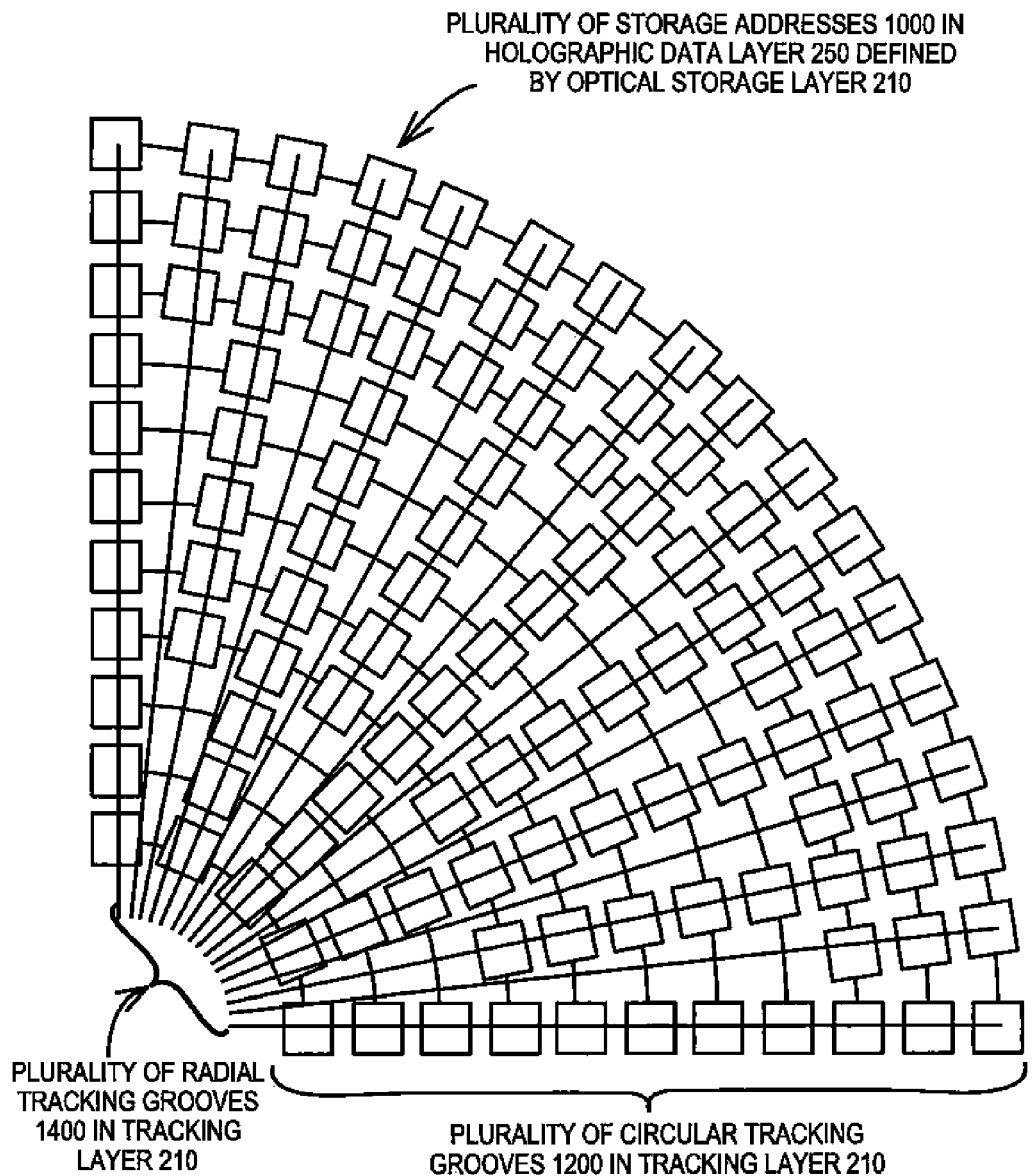
FIG. 15 is an overlay of the plurality of storage addresses of FIG. 10A and the plurality of tracking grooves of FIG. 14.

FIG. 15 comprises an overlay view of the quadrant of holographic data storage layer 250 of FIG. 10B in combination with the quadrant of optical tracking layer 210 of FIG. 14. In the illustrated embodiment of FIG. 15, each of the plurality of holograms 1005 encoded in holographic data storage layer 250 is disposed over one of the plurality of circular tracking grooves 1200, and also over one of the plurality of radial tracking grooves 1400, disposed in optical tracking layer 210 (FIGS. 2, 12A, 12B, 13, 14, 15).

While the preferred embodiments of the present invention have been illustrated in detail, it should be apparent that modifications and adaptations to those embodiments may occur to one skilled in the art without departing from the scope of the present invention as set forth in the following claims.

We claim:

1. A portable data storage assembly, comprising:
    a center point;
    a periphery;
    a holographic data storage layer;
    an optical tracking layer comprising addressing information for said holographic data storage layer, wherein said addressing information defines a first storage band comprising a first plurality of storage addresses and a second storage band comprising a second plurality of storage addresses, wherein said second plurality of storage addresses is greater than said first plurality of storage addresses;
    said first plurality of storage addresses overlay a first portion each of (N) radii, wherein each of said (N) radii originates at said center point and extends to said periphery, wherein(N) is greater than or equal to 1.

2. The portable data storage assembly of claim 1, wherein:
    said optical tracking layer comprises at least one tracking groove disposed therein;
    each of said first plurality of storage addresses and each of said second plurality of storage addresses overlay one of said at least one tracking groove.

3. The portable data storage assembly of claim 2, wherein said at least one tracking groove comprises a spiral shape.

4. The portable data storage assembly of claim 3, wherein said at least one tracking groove define a plurality of concentric circles.

5. The portable data storage assembly of claim 1, wherein:
    said first storage band is symmetrically disposed around said center point;
    said second storage band is symmetrically disposed around said center point between said first storage band and said periphery.

6. The portable data storage assembly of claim 1, wherein:
    said second plurality of storage addresses overlay a second portion each of said (N) radii, and overlay a second portion of (M) radii, wherein each of said (M) radii originates at said center point and extends to said periphery, wherein (N) equals (M).

7. The portable data storage assembly of claim 6, wherein said optical tracking layer comprises:
    a plurality of circular tracking grooves disposed therein;
    a plurality of radial tracking grooves disposed therein;
    each of said first plurality of storage addresses and each of said second plurality of storage addresses overlay one of said plurality of circular tracking grooves, and overlay one of said plurality of radial tracking grooves.

8. The portable data storage assembly of claim 1, wherein:
    said addressing information defines a third storage band comprising a third plurality of storage addresses, wherein said third plurality of storage address is greater than said second plurality of storage addresses.

9. The portable data storage assembly of claim 8, wherein said third storage band is symmetrically disposed around said center point between said second storage band and said periphery.

10. The portable data storage assembly of claim 9, wherein:
    said optical tracking layer comprises at least one tracking groove disposed therein;
    each of said first plurality of storage addresses and each of said second plurality of storage addresses and each of said third plurality of storage addresses overlay one of said at least one tracking groove.

11. The portable data storage assembly of claim 8, wherein said third plurality of storage addresses overlay a third portion of each of (N) radii, and overlay a third portion of each of (M) radii, and overlay a third portion of each of (P) radii, wherein each of said (N) radii, and each of said (M) radii, and each of said (P) radii originates at said center point and extends to said periphery, wherein [(N)+(M)] equal (P).

12. The portable data storage assembly of claim 11, wherein said optical tracking layer comprises:
    a plurality of circular tracking grooves disposed therein;
    a plurality of radial tracking grooves disposed therein;
    each of said first plurality of storage addresses and each of said second plurality of storage addresses and each of said third plurality of storage addresses overlay one of said plurality of circular tracking grooves, and overlay one of said plurality of radial tracking grooves.

13. A data storage and retrieval system, comprising:
a plurality of storage slots;
a plurality of portable data storage assemblies removeably disposed in said plurality of storage slots, wherein each of said portable data storage assemblies comprises a center point, a periphery, a holographic data storage layer, an optical tracking layer, wherein said holographic data storage layer comprises a first storage band comprising a first plurality of encoded holograms and a second storage band comprising a second plurality of encoded holograms, wherein said second plurality of encoded holograms is greater than said first plurality of encoded holograms, said first storage band is symmetrically disposed around said center point, said second storage band is symmetrically disposed around said center point between said first storage band and said periphery, said first plurality of encoded holograms overlay a first portion of each of (N) radii, and each of said (N) radii originates at said center point and extends to said periphery, wherein (N) is greater than or equal to 1;
a data drive comprising a beam splitter, a first lasing device, a second lasing device, a first optical sensor comprising a reflective spatial light modulator, a second optical sensor, a drive controller, and a drive motor, wherein each of said plurality of portable data storage assemblies can be removeably disposed in said data drive;
an accessor moveably disposed therein and comprising a vertical pillar, a lifting servo section moveable disposed on said vertical pillar, and a gripper disposed on said lifting servo section, wherein said accessor can retrieve a designated one of said plurality of portable data storage assemblies, transport that designated portable data storage assembly to said data drive, and disposed said portable data storage assembly into said data drive;
said first storage band is symmetrically disposed around said center point;
said second storage band is symmetrically disposed around said center point between said first storage band and said periphery.

14. The data storage and retrieval system of claim 13, wherein said second plurality of encoded holograms overlay a second portion of each of said (N) radii, and overlay a second portion of (M) radii, wherein each of said (M) radii originates at said center point and extends to said periphery, wherein (N) equals (M).

15. The data storage and retrieval system of claim 14, wherein said holographic data storage layer comprises a third storage band comprising a third plurality of encoded holograms, wherein said third plurality of encoded holograms is greater than said second plurality of encoded holograms.

16. The data storage and retrieval system of claim 15, wherein said third storage band is symmetrically disposed around said center point between said second storage band and said periphery.

17. The data storage and retrieval system of claim 16, wherein said third plurality of encoded holograms overlay a third portion each of said (N) radii, and overlay a third portion of each of said (M) radii, and overlay a third portion of each of (P) radii, wherein each of said (P) radii originates at said center point and extends to said periphery, wherein [(N)+(M)] equal (P).

* * * * *